(12) United States Patent
McAllister et al.

(10) Patent No.: US 12,045,928 B2
(45) Date of Patent: Jul. 23, 2024

(54) RAY TRACING PROCESSOR

(71) Applicant: QUALCOMM Incorporated, San Diego, CA (US)

(72) Inventors: David Kirk McAllister, Holladay, UT (US); Fei Wei, San Diego, CA (US); Alexei Vladimirovich Bourd, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 251 days.

(21) Appl. No.: 17/665,341

(22) Filed: Feb. 4, 2022

(65) Prior Publication Data

US 2023/0252717 A1 Aug. 10, 2023

(51) Int. Cl.
*G06T 15/06* (2011.01)
*G06T 15/00* (2011.01)

(52) U.S. Cl.
CPC ............ *G06T 15/06* (2013.01); *G06T 15/005* (2013.01)

(58) Field of Classification Search
None
See application file for complete search history.

(56) References Cited

U.S. PATENT DOCUMENTS

| | | | | |
|---|---|---|---|---|
| 10,699,366 | B1* | 6/2020 | Kenney | G06F 9/3851 |
| 2014/0362074 | A1* | 12/2014 | Karras | G06T 15/06 345/419 |
| 2016/0070767 | A1 | 3/2016 | Karras et al. | |
| 2019/0318445 | A1* | 10/2019 | Benthin | G06T 15/005 |
| 2020/0051315 | A1* | 2/2020 | Laine | G06T 15/005 |
| 2021/0287429 | A1 | 9/2021 | Vaidyanathan et al. | |
| 2022/0012934 | A1* | 1/2022 | Gruen | G06T 15/005 |
| 2022/0036639 | A1* | 2/2022 | Rabbani Rankouhi | G06T 17/005 |
| 2022/0051467 | A1* | 2/2022 | Woop | G06T 15/06 |
| 2023/0206542 | A1* | 6/2023 | Ghodrat | G06T 17/10 345/418 |
| 2023/0206543 | A1* | 6/2023 | Shkurko | G06T 15/08 345/418 |

OTHER PUBLICATIONS

International Search Report and Written Opinion—PCT/US2023/060822—ISA/EPO—May 12, 2023.
Nah J-H., et al., "Hart: A Hybrid Architecture for Ray Tracing Animated Scenes", IEEE Transactions on Visualization and Computer Graphics, IEEE, USA, vol. 21, No. 3, Mar. 1, 2015 (Mar. 1, 2015), pp. 389-401, XP011571296, ISSN: 1077-2626, DOI: 10.1109/TVCG.2014.2371855, abstract, p. 1, col. 1, line 1—p. 5, col. 1, line 4, figures 1-5.

* cited by examiner

*Primary Examiner* — Andrew G Yang
(74) *Attorney, Agent, or Firm* — Polsinelli

(57) ABSTRACT

Systems and techniques are provided for enhancing operations of a ray tracing processor. For instance, a process can include obtaining one or more nodes of an acceleration data structure. Each node of the one or more nodes includes the same number of bytes. The node(s) can be stored in a cache associated with a ray tracing processor. Each of the stored node(s) are cache line-aligned with the cache associated with the ray tracing processor. A first stored node of the stored node(s) can be provided to the ray tracing processor and processed by the ray tracing processor during a first clock cycle of the ray tracing processor. A second stored node of the stored node(s) can be provided to the ray tracing processor and processed by the ray tracing processor during a second clock cycle of the ray tracing processor.

29 Claims, 13 Drawing Sheets

RAY TRACING PROCESSOR

FIELD

The present disclosure generally relates to graphics processing. For example, aspects of the present disclosure are related to systems and techniques for enhancing operations related to ray tracing.

BACKGROUND

Ray tracing is a computer graphics technique that can be used to generate images by tracing paths of light through a three-dimensional scene, simulating interactions with objects illuminated by light sources, and determining ray intersections. Ray intersections can include ray-primitive intersections or ray-object intersections. Primitives are geometric shapes that can be used to construct or model larger three-dimensional objects. For example, primitives can include triangles or polygons.

Ray tracing can be used to generate realistic images, including shadows, of a three-dimensional scene. Scene geometry can be stored in an acceleration data structure that groups scene primitives. An acceleration data structure can be used to accelerate the process of ray tracing by improving the efficiency of ray intersection tests and/or calculations. For example, a bounding volume hierarchy (BVH) is an acceleration data structure that can group scene primitives in a hierarchical tree of bounding volumes enclosing one or more of the scene primitives. Ray tracing can be performed by traversing these hierarchies to determine ray-primitive and/or ray-object intersections.

BRIEF SUMMARY

In some examples, systems and techniques are described for enhancing operations of a ray tracing processor (e.g., a ray tracing unit (RTU)). For example, the ray tracing processor (e.g., RTU) can perform one ray-node intersection per clock for multiple different node types and/or node contents. According to at least one illustrative example, a method is provided for ray tracing, the method including: obtaining one or more nodes of an acceleration data structure, each node of the one or more nodes including a same number of bytes; storing the one or more nodes in a cache associated with a ray tracing processor, wherein each of the one or more stored nodes are cache line-aligned with the cache associated with the ray tracing processor; providing a first stored node of the one or more stored nodes for processing by the ray tracing processor, wherein the first stored node is provided for processing by the ray tracing processor during a first clock cycle of the ray tracing processor; and providing a second stored node of the one or more stored nodes for processing by the ray tracing processor, wherein the second stored node is provided for processing by the ray tracing processor during a second clock cycle of the ray tracing processor.

In another example, an apparatus for ray tracing is provided that includes a memory (e.g., configured to store data, such as virtual content data, one or more images, etc.) and one or more processors (e.g., implemented in circuitry) coupled to the memory. The one or more processors are configured to and can: obtain one or more nodes of an acceleration data structure, each node of the one or more nodes including a same number of bytes; store the one or more nodes in a cache associated with a ray tracing processor, wherein each of the one or more stored nodes are cache line-aligned with the cache associated with the ray tracing processor; provide a first stored node of the one or more stored nodes for processing by the ray tracing processor, wherein the first stored node is provided for processing by the ray tracing processor during a first clock cycle of the ray tracing processor; and provide a second stored node of the one or more stored nodes for processing by the ray tracing processor, wherein the second stored node is provided for processing by the ray tracing processor during a second clock cycle of the ray tracing processor.

In another example, a non-transitory computer-readable medium is provided that has stored thereon instructions that, when executed by one or more processors, cause the one or more processors to: obtain one or more nodes of an acceleration data structure, each node of the one or more nodes including a same number of bytes; store the one or more nodes in a cache associated with a ray tracing processor, wherein each of the one or more stored nodes are cache line-aligned with the cache associated with the ray tracing processor; provide a first stored node of the one or more stored nodes for processing by the ray tracing processor, wherein the first stored node is provided for processing by the ray tracing processor during a first clock cycle of the ray tracing processor; and provide a second stored node of the one or more stored nodes for processing by the ray tracing processor, wherein the second stored node is provided for processing by the ray tracing processor during a second clock cycle of the ray tracing processor.

In another example, an apparatus for ray tracing is provided. The apparatus includes: means for obtaining one or more nodes of an acceleration data structure, each node of the one or more nodes including a same number of bytes; means for storing the one or more nodes in a cache associated with a ray tracing processor, wherein each of the one or more stored nodes are cache line-aligned with the cache associated with the ray tracing processor; means for providing a first stored node of the one or more stored nodes for processing by the ray tracing processor, wherein the first stored node is provided for processing by the ray tracing processor during a first clock cycle of the ray tracing processor; and means for providing a second stored node of the one or more stored nodes for processing by the ray tracing processor, wherein the second stored node is provided for processing by the ray tracing processor during a second clock cycle of the ray tracing processor.

In some aspects, one or more of the apparatuses described above is or is part of a camera, a mobile device (e.g., a mobile telephone or so-called "smart phone" or other mobile device), a wearable device, an extended reality device (e.g., a virtual reality (VR) device, an augmented reality (AR) device, an extended reality (XR) device, or a mixed reality (MR) device), a personal computer, a laptop computer, a server computer, or other device. In some aspects, an apparatus includes a camera or multiple cameras for capturing one or more images. In some aspects, the apparatus further includes a display for displaying one or more images, notifications, and/or other displayable data. In some aspects, the apparatus can include one or more sensors, which can be used for determining a location and/or pose of the apparatus, a state of the apparatuses, and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following drawing figures.

DETAILED DESCRIPTION

Figure 1:
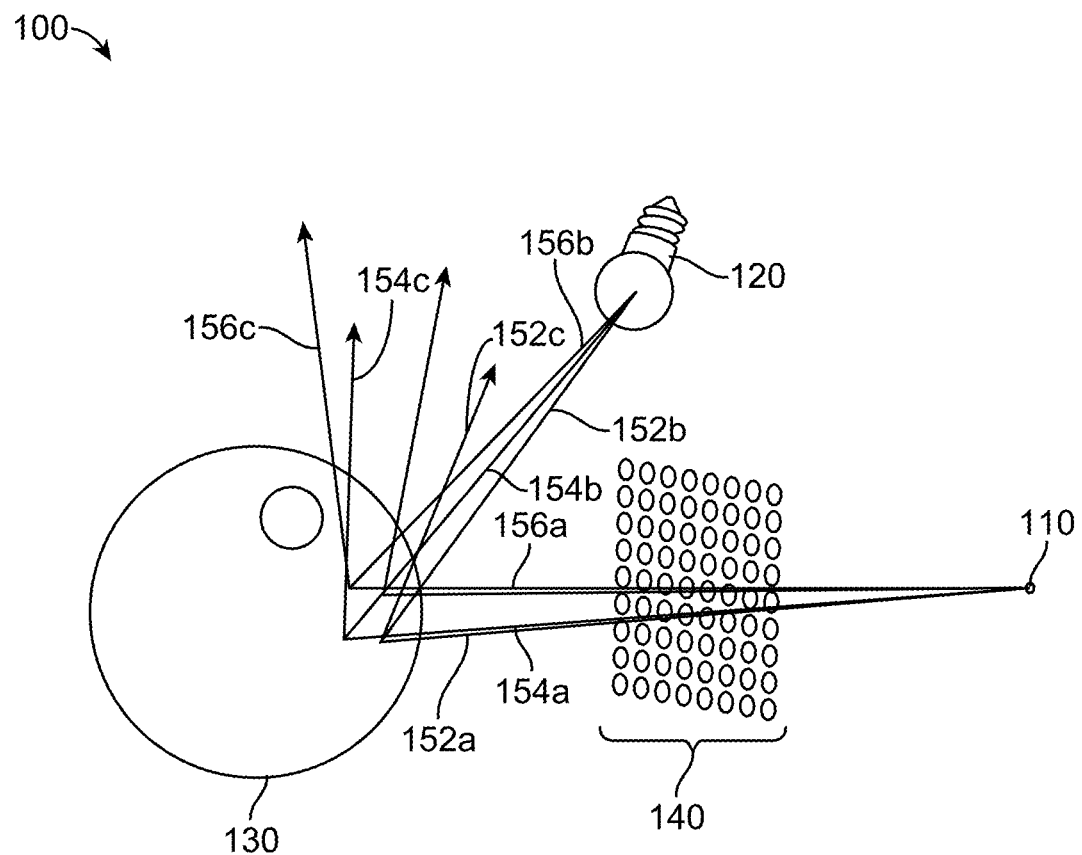
FIG. 1 illustrates an example of a ray tracing process, in accordance with some examples of the present disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims. Ray tracing is a graphics processing and rendering technique that can be used to produce photorealistic images by modeling light transport to simulate optical effects. Ray tracing can realistically simulate the lighting of a three-dimensional (3D) scene and its objects by rendering physically correct reflections, refractions, shadows, and indirect lighting in the two-dimensional (2D) view of the scene.

Ray tracing can be a computationally intensive technique. For example, the computational resources (e.g., compute time) used to ray trace a single frame can increase with the number of rays that are traced per frame and/or can increase with the computational resources (e.g., compute time) expended to trace each individual ray. Due to this computational complexity, ray tracing may often be limited to non-real time uses. Real-time ray tracing has long been sought after for uses such as rendering video games, virtual reality (VR) and augmented reality (AR) experiences, etc. Real-time ray tracing has recently become possible, using, for example, hardware acceleration units and/or graphics processing units (GPUs) that can provide parallelization of the underlying calculations for each individual ray that is projected into a scene.

The number of rays that can be projected into a scene for each frame is often relatively small, as the rendering time per frame cannot exceed some maximum amount without losing real-time performance. The image quality when using real-time ray tracing can be improved by increasing the number of rays projected into the scene per frame. This can be achieved by increased parallelization (e.g., providing additional computational resources that allow more rays to be traced simultaneously). However, hardware upgrades can carry high upfront costs and may be difficult or impossible to retrofit onto existing systems and platforms.

The number of rays projected into the scene per frame can also be increased by tracing each ray more efficiently (e.g., reducing the compute time per ray tracing operation can allow a greater number of ray tracing operations to be performed in the same fixed rendering time per frame). In some cases, the image quality when using real-time ray tracing can be improved by using one or more hardware accelerators to perform ray-node intersections. Ray tracing hardware acceleration units can obtain acceleration data structure nodes from a cache and perform ray-node intersections using the cached node and a given input ray. When the acceleration data structure nodes stored in the cache are not cache line-aligned, the input node data needed to perform ray-node intersection may be stored on two or more cache lines. Non-cache line-aligned node data can cause a ray tracing hardware acceleration unit to remain idle for one or more clock cycles (e.g., until the input node data has been fully ingested from the multiple cache lines). Idle clock cycles can reduce the number of rays that can be traced in a given amount of time, which can reduce image quality and/or efficiency when using real-time ray tracing.

A scalable and efficient solution that can improve the performance of real-time ray tracing is desirable. As described in more detail below, systems and techniques are described herein for enhancing operations of a ray tracing processor. In one illustrative example, the ray tracing processor can be a ray tracing unit (RTU), as will be described in greater depth below. In some aspects, the ray tracing processor (e.g., RTU) can perform one ray-node intersection per clock for multiple different node types and/or node contents, based at least in part on using cache line-aligned acceleration data structure nodes. In some examples, the ray tracing processor can be a RTU that is included in a graphics processing unit (GPU) and/or a ray tracing system, as will also be described in greater depth below.

FIG. 1 is a diagram illustrating an example of a ray tracing technique 100. As illustrated, a ray tracing system can perform ray tracing by casting a plurality of rays (e.g., ray 152a, ray 154a, and ray 156a) from a virtual or imaginary view camera 110 (e.g., which determines the view into the 3D scene), through the pixels 140 of a 2D viewing plane, out into the 3D scene. The ray tracing system can then trace the path of each ray to determine if the ray reaches back to a light source 120 in the 3D scene.

In this technique, each ray is projected through a particular pixel of the plurality of pixels 140 that are located on the 2D viewing plane. In the event a particular ray reaches a light source (e.g., light source 120) in the 3D scene, then information from that ray can be used to contribute to the final color and/or illumination level of the pixel (from the pixels 140) through which the particular ray was projected. For example, when rays projected into the scene intersect with one or more objects (e.g., such as object 130), color and lighting information from the point(s) of intersection on the object(s) surfaces can contribute to the final colors and illumination levels of the pixels associated with the rays. Similarly, different objects can have different surface properties that reflect, refract, and/or absorb light in different ways, which can also contribute to the final pixel colors and/or illumination level. Rays can also reflect off of objects and hit other objects in the scene, or travel through the surfaces of transparent objects, etc., before reaching a light source (e.g., light source 120).

For example, as illustrated in FIG. 1, ray 152a is projected into the scene and intersects object 130, resulting in generation of a first reflection ray 152b and a second reflection ray 152c. The first reflection ray 152b reaches light source 120 and consequently, can contribute color or illumination information for rendering the particular one of the pixels 140 through which ray 152 was projected. The second reflection ray 152c does not reach light source 120, and consequently, may not directly contribute color or illumination information back to the pixels 140. A same or similar scenario is illustrated for ray 154a and its first reflection ray 154b (which reaches light source 120) and second reflection ray 154c (which does not reach light source 120), as well as for ray 156a and its first reflection ray 156b (which reaches light source 120) and second reflection ray 156c (which does not reach light source 120).

As mentioned previously, each interaction between a ray and an object or surface within the 3D scene can contribute color and/or illumination information back to the particular pixel through which the ray was projected. In some cases, tracing a greater number of interactions per ray can provide increased visual fidelity (e.g., quality) of the rendered scene at the expense of increased computational cost (e.g., time). For example, a ray tracing approach that prioritizes speed over quality might calculate or otherwise determine only the first reflection for each ray, while a ray tracing approach that prioritizes quality over speed might determine three or more reflections per ray. In some cases, after observing either a maximum number of reflections or a ray traveling a certain distance without intersection), the ray can cease to travel and the pixel's value can be updated. In some cases, the ray can cease to travel and the pixel's value can be updated based on a ray traveling a certain distance without reflection (e.g., reflection being one possible outcome of an intersection). In some cases, the number of rays that are projected through each pixel of the 2D viewing plane can be adjusted based on a similar tradeoff between computational cost and visual fidelity.

Ray tracing can therefore become very costly in terms of the time and/or computational power that is required to render realistic-looking scenes, based, for example, on the number of rays projected into the scene and the number of additional rays that are traced for secondary reflections and refractions. Due to this computational complexity, ray tracing had been typically limited to non-real time uses (e.g., scenes or visual effects that could be rendered in advance for film and television). Real-time ray tracing has long been sought after for use cases such as rendering video games, virtual reality (VR) and augmented reality (AR) experiences, etc.

Real-time ray tracing has recently become possible and is often performed by hardware acceleration units and/or graphics processing units (GPUs) that can provide parallelization of the underlying calculations for each individual ray that is projected into the scene. The number of rays that can be projected into the scene for each frame is often relatively small, as the rendering time per frame cannot exceed some maximum amount without losing real-time performance.

The image quality when using real-time ray tracing can be improved by increasing the number of rays projected into the scene per frame. This can be achieved by increased parallelization (e.g., providing additional computational resources that allow more rays to be traced simultaneously). However, hardware upgrades can carry high upfront costs and may be difficult or impossible to retrofit onto existing systems and platforms. A scalable and efficient solution that can improve the real-time performance of existing ray tracing hardware is desirable. For example, the number of rays projected into the scene per frame can also be increased by tracing each ray more efficiently (e.g., reducing the compute time per ray trace operation allows more ray trace operations to be performed in the same fixed rendering time per frame).

Figure 2A:
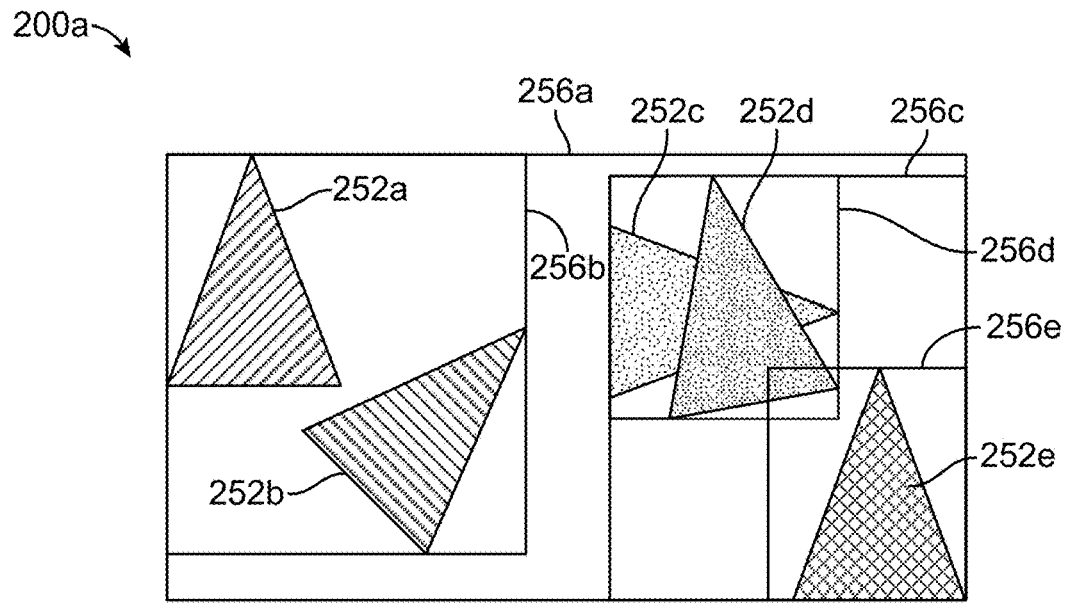
FIG. 2A illustrates an example of bounding volumes including one or more primitives representing portions of surfaces in a scene, in accordance with some examples of the present disclosure.
Figure 2B:
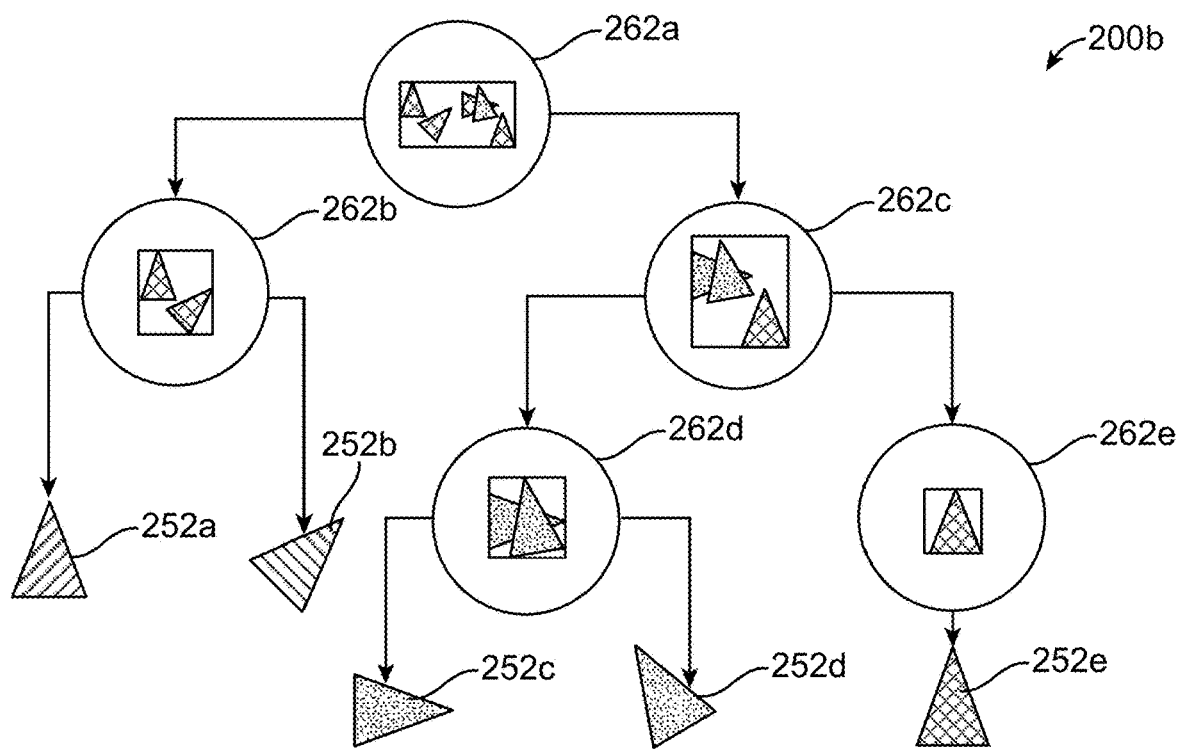
FIG. 2B illustrates an example of a bounding volume hierarchy (BVH) organizing the bounding volumes of FIG. 2A, in accordance with some examples of the present disclosure.

One example of a ray tracing acceleration technique utilizes tree-based acceleration structures to improve the efficiency of ray intersection tests. For example, scenes can be converted into bounding volume hierarchies (BVHs), which are hierarchical tree structures composed of ever-tighter bounding volumes (also referred to as "bounding regions" such as bounding boxes or "axis-aligned bounding boxes" (AABBs)). For example, FIG. 2A illustrates an example structure 200a in which a scene containing a plurality of triangle primitives 252a-252e is arranged into a series of ever-tighter bounding boxes 256a-256e. Scenes may contain hundreds, thousands, or more primitives, but for purposes of clarity, only the five triangle primitives 252a-252e are depicted. The bounding boxes 256a-256e can be AABBs, which are bounding boxes having a minimized area or volume within which all points of the enclosed primitives (e.g., triangle primitives 252a-252e) may lie. The bounding boxes may be axis-aligned such that the edges of each bounding box 256a-256e are parallel to a coordinate axis (e.g., the x, y, and z axes). FIG. 2B illustrates an example hierarchical data structure 200b having nodes that are associated with the bounding boxes 256a-256e and triangle primitives 252a-252e shown in FIG. 2A. The hierarchical data structure 200b can be a BVH. For example, a BVH root node 262a can correspond to the bounding box 256a shown in FIG. 2A; similarly, an intermediate BVH node 262b can correspond to the bounding box 256b of FIG. 2A; intermediate BVH node 262c can correspond to the bounding box 256c of FIG. 2A, and so on.

A BVH root node (e.g., BVH root node 262a of FIG. 2B) contains an AABB (e.g., bounding box 256a of FIG. 2A) enclosing all the individual scene or object geometry contained in the BVH leaf nodes. Each primitive in the BVH root node is assigned to either the left or right child node. The child nodes contain the AABBs containing their assigned geometry, and this geometry is likewise assigned to left or right child nodes, recursively until the BVH leaf nodes contain a small number of primitives, e.g., four or fewer. Depending on the extent of any scene changes and/or object deformations, the next and any subsequent frames may require one or more new BVH build operations or BVH refitting/update operations based on the scene changes.

Testing each ray for intersection against every primitive in the scene can be inefficient and computationally expensive. BVHs can be used to accelerate ray intersection testing techniques. For example, each ray can be tested for intersection against BVH bounding boxes using a depth-first tree traversal process instead of against every primitive in the scene. As mentioned previously, bounding boxes encompass or surround different amounts of scene geometry or primitives and become increasingly tighter with the depth of the BVH tree structure.

Figures 3A, 3B:
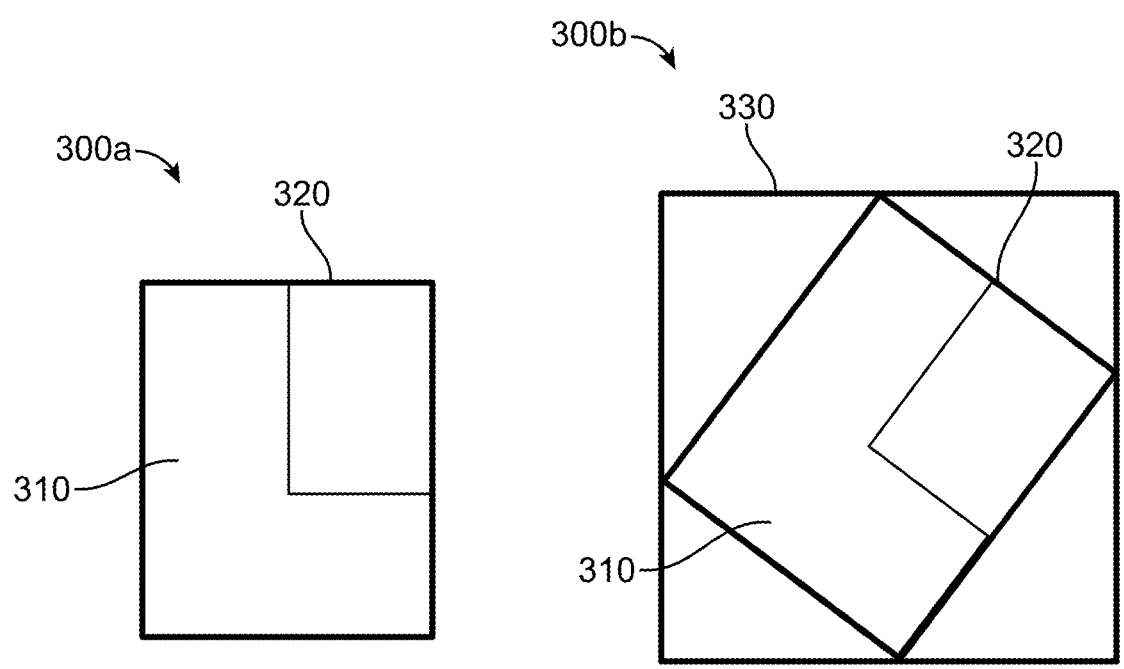
FIG. 3A illustrates an example of a scene object and an object-space bounding volume enclosing the scene object, in accordance with some examples of the present disclosure.
FIG. 3B illustrates an example of a world-space bounding volume enclosing the object-space bounding volume and scene object of FIG. 3A, in accordance with some examples of the present disclosure.

Bounding boxes (e.g., AABBs or other bounding boxes) or other bounding regions can be defined with respect to world-space or object-space. World-space can be considered a constant (e.g., the coordinate space of the overall 3D scene). Objects can exist in their own coordinate space, which is referred to as object-space (e.g., the coordinate space in which the object was modeled or created). For example, FIGS. 3A and 3B are diagrams depicting object-space and world-space AABBs (axis-aligned bounding boxes) for the same geometry. Here, FIG. 3A illustrates an object-space AABB 320 of a geometric scene object 310. Scene objects can include the 3D or graphical objects that are present in a 3D scene for which ray tracing is performed. In some cases, geometric scene objects can be scene objects that include geometric primitives such as triangles. In some examples, scene objects can include AABBs or other object representations. Object-space AABB 320 and scene object 310 are both shown in the object-space 300a of the scene object 310. FIG. 3B illustrates the same geometric scene object 310 but transformed into the world-space 300b of the scene (e.g., the scene to which scene object 310 belongs or is located). A world-space AABB 330 encloses both the object-space AABB 320 and the scene object 310.

Figure 4A:
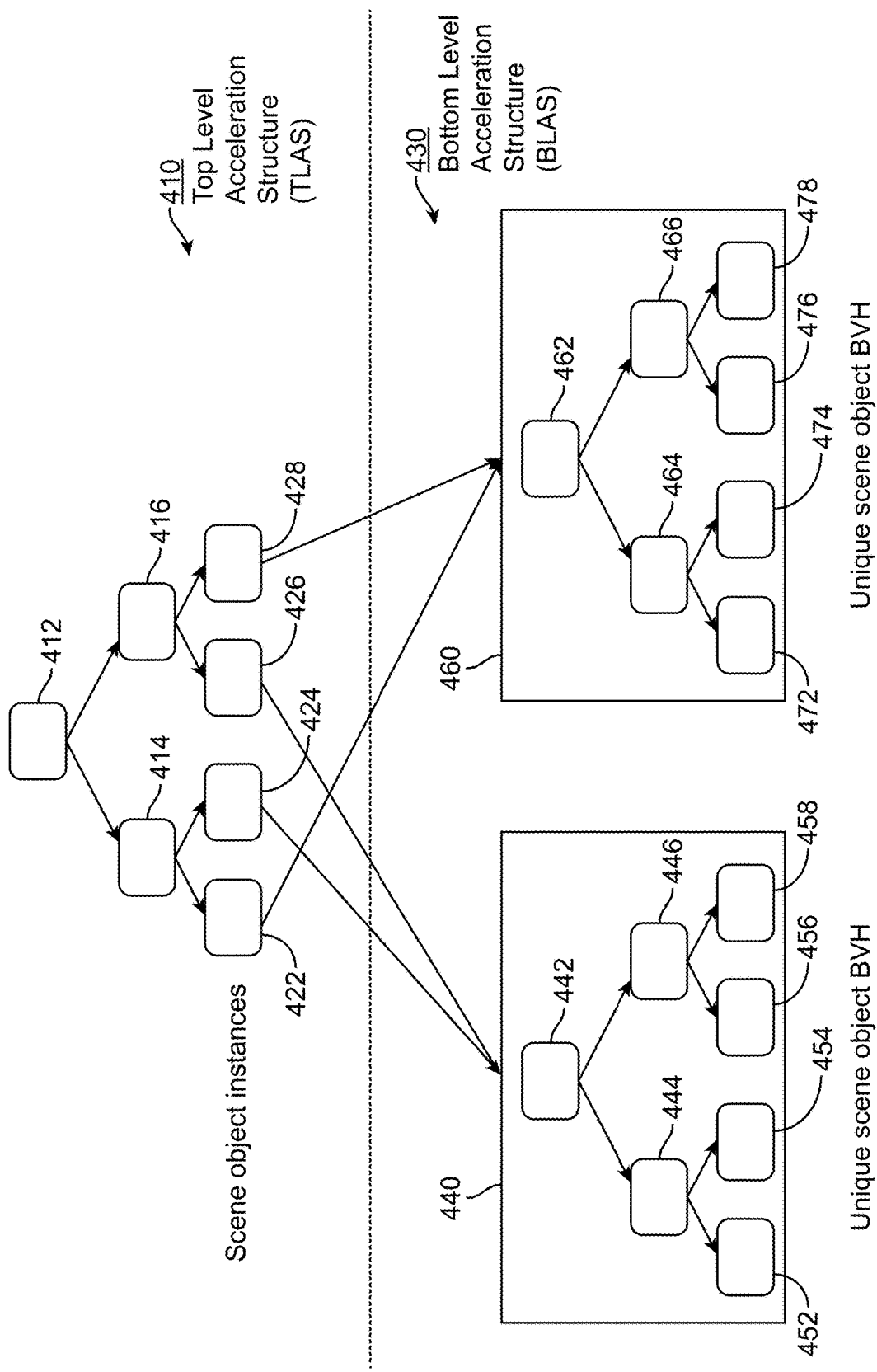
FIG. 4A illustrates an example of an acceleration data structure including a top-level acceleration structure (TLAS) and a bottom-level acceleration structure (BLAS), in accordance with some examples of the present disclosure.

Ray tracing can utilize a two-level acceleration structure system, such as a top-level acceleration structure (TLAS) and a bottom-level acceleration structure (BLAS), as depicted in FIG. 4A. For example, FIG. 4 illustrates a TLAS 410 and a BLAS 430, which are described in greater depth below.

The TLAS 410 is built in world-space. TLAS primitives are instances of BLASs, which are defined in object-space. A TLAS can be constructed as a BVH with leaf nodes (including leaf nodes 412, 414, 416, 422, 424, 426, and 428) containing a BLAS. For example, the TLAS leaf nodes 422, 424, 426, and 428 each contain or are otherwise associated with one of the two BLASs 440 and 460. A translation matrix can be encoded in the TLAS leaf node to perform conversion from world-space to object-space and/or vice versa, as described in greater depth below.

A BLAS can be constructed for each object in a scene, referred to as a scene object. For example, FIG. 4A illustrates a BLAS 440 that may be constructed for a first unique scene object and a BLAS 460 that may be constructed for a second unique scene object. BLAS 440 includes leaf nodes 442, 444, 446, 452, 454, 456, and 458 and BLAS 460 includes leaf nodes 462, 464, 466, 472, 474, 476, and 478. BLAS primitives can be the triangles or the AABBs of procedural primitives used to build the scene object. A bottom level BVH is built over the set of these triangles or AABBs of the scene object, with each BLAS leaf node containing a small number (e.g., up to four, five, or some other number) of triangles or AABBs. For example, in the context of FIG. 4A, the BLAS leaf nodes 452-458 and 472-478 can each contain some quantity of triangles, AABBs, or other primitives used to build the scene object. In some examples, a BLAS can also be referred to as a "bottom level BVH." Multiple instances of the same BLAS can be included in a TLAS. For example, if a TLAS includes a car object, then a BLAS of a tire can be included four times. The same BLAS can also be included in or referenced by multiple TLASs, as illustrated in FIG. 4A.

In some examples, a TLAS can be created using an Object-To-World matrix, which transforms an input represented in object-space coordinates to an output representation in world-space coordinates. A World-To-Object matrix can apply the transformation in the opposite direction (e.g., transforming an input represented in world-space coordinates to an output representation in object-space coordinates). In some cases, a TLAS can be built over a set of BLASs by using the Object-To-World matrix to compute the world-space AABB of each BLAS (e.g., the world-space AABB of the BLAS root nodes 442 and 462). A BVH is then built over these world-space AABBs of the BLAS root nodes and can be referred to as a top level BVH or the TLAS 410. In some cases, TLAS and BLAS creation can be performed using a similar or identical technique. For example, the same SAH-based (Surface Area Heuristic) algorithm or approach can be utilized for both TLAS and BLAS construction.

Figure 4B:
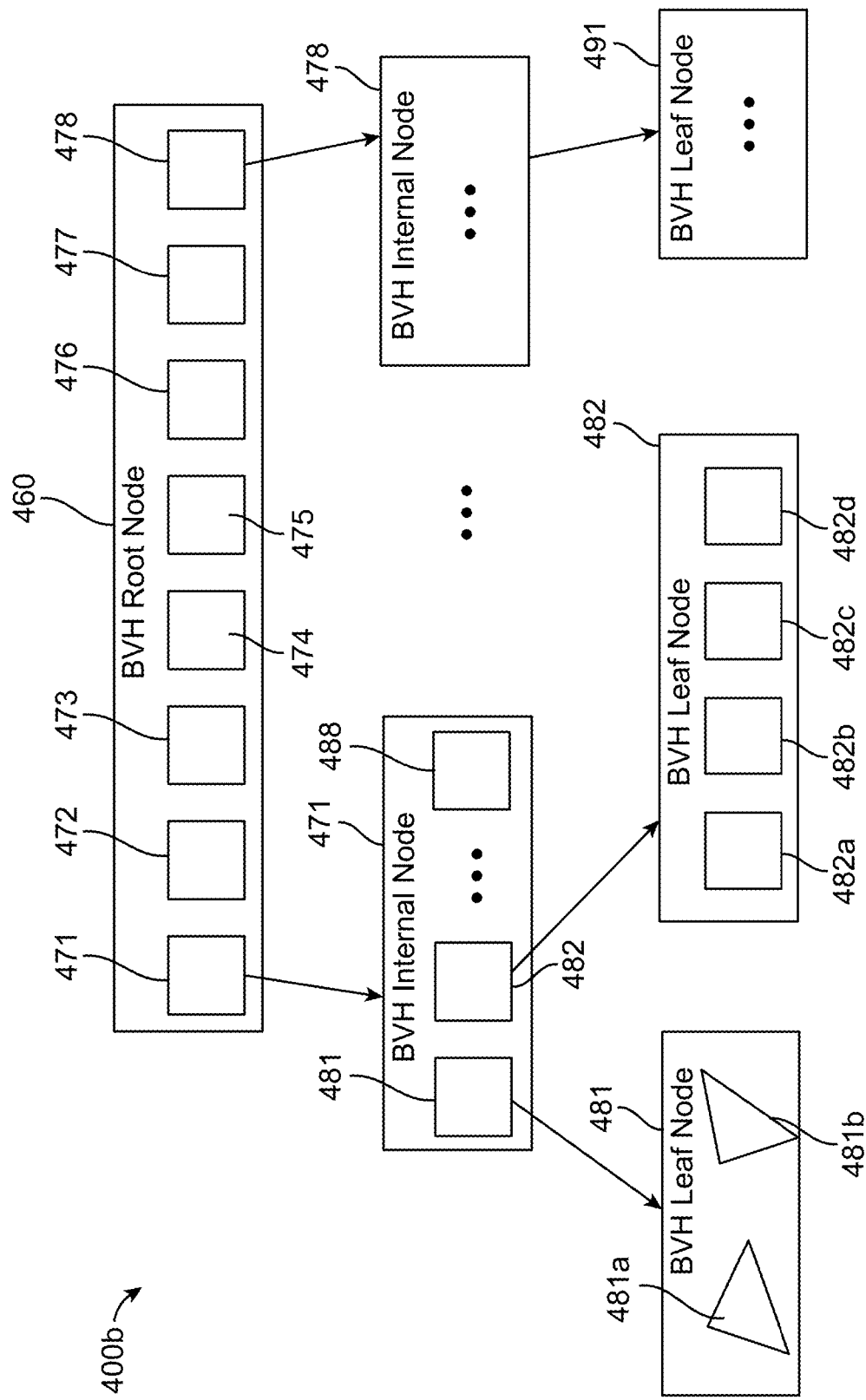
FIG. 4B illustrates an example of an acceleration data structure that includes leaf nodes containing triangles and leaf nodes containing bounding volumes, in accordance with some examples of the present disclosure.

FIG. 4B is a diagram illustrating an example of an acceleration data structure 400b that includes or stores both triangles and bounding volumes. In some examples, acceleration data structure 400b can be a BVH (e.g., as is illustrated in FIG. 4B), although it is noted that other hierarchical tree structures and/or other acceleration data structures can also be utilized. As illustrated in FIG. 4B, acceleration data structure 400b (e.g., a BVH) includes a BVH root node 470 that includes a plurality of bounding volumes 471-478. The bounding volumes 471-478 can correspond to or otherwise be constructed for the child nodes of BVH root node 470. For instance, the eight bounding volumes 471-478 can be AABBs for eight corresponding child nodes of the BVH root node 470.

In the example of FIG. 4B, the acceleration data structure 400b has a branching factor of eight. The branching factor of an acceleration data structure is the maximum number of child nodes that may be associated with or contained by any parent node within the acceleration data structure. The number of child nodes associated with some internal nodes can be less than the branching factor. For example, acceleration data structure 400b has a branching factor of eight, but some internal nodes within acceleration data structure 400b may have less than eight child nodes. It is noted that a larger or smaller branching factor can also be used to generate an acceleration structure such as the acceleration data structure 400b. In cases where acceleration data structure 400b uses a larger or smaller branching factor, the BVH root node 470 and/or the BVH internal nodes (e.g., shown here as BVH internal nodes 471-478) can likewise include a greater or lesser number of bounding volumes or AABBs.

As mentioned above, BVH root node 470 includes AABBs for its eight child nodes 471-478. In some examples, the AABBs for child nodes 471-478 can be stored in the data structure of acceleration data structure 400b (e.g., included in the data representation of the parent node). For instance, the BVH root node 470 can include indices to data storage or memory locations where one or more of its child nodes 471-478 can be obtained or retrieved. In one illustrative example, the BVH root node 470 includes an index to only the first child node (e.g., the BVH internal node 471), with the remaining child nodes (e.g., nodes 472-478) stored adjacent to the memory index of the first child node 471.

Child node 471 is depicted in FIG. 4B as a BVH internal node 471, as node 471 is neither a root nor a leaf of acceleration data structure 400b (e.g., BVH). Internal nodes of acceleration data structure 400b (e.g., such as node 471) can have a number of child nodes that is lesser than or equal to the branching factor, which for acceleration data structure 400b is eight. In some examples, internal BVH nodes (e.g., such as node 471) can contain a bounding volume or AABB for each of their child nodes, as previously described above with respect to the BVH root node 470. BVH internal node 471 contains a plurality of bounding volumes 481-488, which in this case represent the eight child nodes of internal node 471. As illustrated in FIG. 4B, the child nodes of internal node 471 are BVH leaf nodes (e.g., leaf nodes of the BVH acceleration data structure 400b).

For example, the child nodes of internal node 471 include BVH leaf node 481 and BVH leaf node 482 (internal node 471 includes additional child nodes 483-488, which are omitted from the leaf node layer of FIG. 4B for clarity). The child node of internal node 478 includes BVH leaf node 491. As illustrated, BVH leaf node 481 includes two triangles 481a and 481b, which are geometric primitives that can be used to build a scene object or model represented by the acceleration data structure 400b (e.g., BVH). In some cases, the triangles 481a-481b can be enclosed by the corresponding AABB that is stored in internal node 471 for the BVH leaf node 481. In one illustrative example, the coordinates of the triangles 481a-481b can be stored directly in the underlying data structure of acceleration data structure 400b rather than being retrieved from an external data store or data location. For example, the coordinates (e.g., vertices) of triangles 481a-481b can be stored in the BVH leaf node 481 itself.

FIG. 4B depicts BVH leaf node 482 as including four bounding volumes (e.g., AABBs) 482a, 482b, 482c and 482d. In one illustrative example, the bounding volumes 482a-482d can be AABBs of procedural primitives (e.g., representing spheres or other user-defined shapes). In some examples, the bounding volumes 482a-482d can be AABBs of instances of BVHs. As was described above with respect to the BVH leaf node 481, it is noted that the four bounding volumes 482a-482d can be enclosed by the corresponding AABB that is stored in internal node 471 for the BVH leaf node 472. Although FIG. 4B depicts the BVH internal node 471 as including child nodes that contain triangles (e.g., BVH leaf node 481) and child nodes that contain bounding volumes (e.g., BVH leaf node 482), in some examples the BVH acceleration data structure 400b as a whole may include only leaf nodes that contain triangles or may include only leaf nodes that contain bounding volumes.

Systems, apparatuses, processes (also referred to as methods), and computer readable media (collectively referred to as "systems and techniques") are described herein for enhancing operations of a ray tracing processor. For example, the ray tracing processor can be a ray tracing unit (RTU) and/or a ray tracing accelerator. In some aspects, the ray tracing processor (e.g., RTU) can perform one ray-node intersection per clock. In one illustrative example, the ray tracing processor (e.g., RTU) can perform one ray-node intersection per clock based on receiving constant-sized nodes of an acceleration data structure (e.g., a BVH). For example, in a first clock cycle, the ray tracing processor (e.g., RTU) can perform a first ray-node intersection for a first BVH node. In a second clock cycle, the ray tracing processor can perform a second ray-node intersection for a second BVH node, wherein the first clock cycle and the second clock cycle are consecutive.

In some aspects, the ray tracing processor (e.g., RTU) can receive constant-sized nodes that are cache line-aligned with one or more caches that are communicatively coupled to the ray tracing processor. In one illustrative example, the ray tracing processor (e.g., RTU) can perform one ray-node intersection per clock based on receiving constant-sized nodes (e.g., 64 bytes) that are cache line-aligned with one or more of a cache associated with a graphics processing unit (GPU) that includes the ray tracing processor and/or a Level 0 (L0) cache associated with the ray tracing processor, as will be explained in greater depth below.

In some aspects, the ray tracing processor (e.g., RTU) can maintain a throughput of one ray-node intersection per clock for multiple different node types and/or node contents that are provided as input to the RTU. For example, the RTU can receive a node stored in a BVH or other acceleration data structure. A node received at the RTU can be an internal node or a leaf node (e.g., of a BVH). In some cases, the node can contain one or more triangles or other geometrical primitives. In some cases, the node can contain one or more AABBs or other bounding volumes.

In some examples, the RTU can maintain a one node per clock throughput without receiving advanced signaling of the input node type or content. In one illustrative example, the RTU fetches constant-size BVH nodes from memory, with each BVH node obtained in a single fetch. In a first clock cycle, the RTU can perform a first ray-node intersection for the first BVH node. In a second clock cycle, the RTU can perform a second ray-node intersection for the second BVH node, wherein the first and second clock cycles are consecutive. As used herein, the term "BVH node" or "BVH nodes" can also include nodes of one or more other acceleration data structures that can be used to perform ray tracing (e.g., acceleration data structures other than a BVH).

The constant-size BVH nodes (e.g., the 64-byte nodes) can be sized to be cache line-aligned with a cache associated with the RTU (e.g., GPU cache(s) of a GPU that includes the RTU and/or the RTU Level 0 (L0) cache). In some examples, the RTU can include a single width processing pipeline based on the constant size of the BVH nodes. In some cases, compression may have been previously performed to obtain BVH nodes with the constant size (e.g., the constant size 64-byte nodes may be compressed BVH nodes). In some examples, the RTU can include a node decompressor to decompress fetched BVH nodes that were previously compressed. In some examples, the RTU can perform BVH node decompression in the same clock cycle as the subsequent ray intersection calculations that are performed using the decompressed contents of the BVH node. In some examples, the RTU can operate at a shared clock rate (e.g., number of clock cycles per unit time, such as per second). For example, if the RTU is included in a graphics processing unit (GPU) or other ray tracing system, the RTU can operate at the same clock rate as the GPU or ray tracing system (e.g., one clock cycle of the RTU can be the same as one clock cycle of the GPU or ray tracing system). In some examples, the RTU can operate at its own clock rate, which may be different than the clock rate of a GPU or ray tracing system that includes the RTU.

In one illustrative example, a compressed (e.g., 64-byte) BVH node can include up to eight AABBs of child nodes when the BVH node is an internal node. When the BVH node is a leaf node, the compressed (e.g., 64-byte) BVH leaf node can contain up to four triangles or other geometrical primitives. In some examples, a compressed (e.g., 64-byte) BVH leaf node can contain up to four AABBs of procedural primitives (e.g., representing spheres or other non-triangle shapes) or can contain up to four AABBs of instances of other BVHs.

As mentioned previously, in a single clock cycle the RTU can perform ray-node intersection for each possible node type that might be fetched, and additionally can do so without advance knowledge of the incoming node type. In one illustrative example, the RTU includes an arithmetic logic unit (ALU) that can consume each possible BVH node type in a single clock cycle. In some examples, the RTU ALU can consume BVH nodes from a BVH node decompressor.

In some cases, a parallel processing capacity of the ALU (e.g., a width of the ALU) can be greater than or equal to the maximum number of primitives that can be contained in any given BVH node that is provided to the RTU and/or the RTU ALU. For example, a width of the RTU ALU can be based at least in part on the BVH node compression scheme and the range of possible decompression outputs.

For example, the constant-sized (e.g., 64-byte) compressed BVH nodes described above can include a maximum of eight AABBs (e.g., for internal nodes) or a maximum of four triangles (e.g., for leaf nodes). In some examples, the constant-sized (e.g., 64-byte) compressed BVH nodes can include a maximum quantity of AABBs that is twice as large as a maximum quantity of triangles. In some aspects, the RTU ALU can be sized to perform up to eight ray-AABB intersections per clock or up to four ray-triangle intersections per clock. In one illustrative example, the RTU ALU can include eight ray-AABB ALUs and four ray-triangle ALUs, although it is noted that different quantities and/or ratios of ray-AABB ALUs and ray-triangle ALUs may also be utilized.

In one illustrative example, the RTU ALU can include four shared RB-RT (e.g., Ray-Box, Ray-Triangle) logic units. As will be explained in greater depth below, each shared RB-RT logic unit can perform two ray-AABB intersections per clock or can perform one ray-triangle intersection per clock. This 2:1 ratio matches the 8:4 maximum input sizes expected for AABBs and triangles, respectively. Therefore, in some examples, using the four shared RB-RT logic units, the RTU described herein can completely ingest and process any of the possible decompressed BVH node contents.

In some examples, the RB-RT logic units described above can each include a shared floating point logic sub-unit to perform floating point ALU operations that are common to (e.g., shared between) both the ray-AABB intersection sub-unit(s) and the ray-triangle intersection sub-unit(s) of the RB-RT logic unit.

For example, in a first clock cycle in which the input BVH node contains AABBs, the two ray-AABB intersection sub-units of the RB-RT can use the shared floating point logic sub-unit to perform ray-AABB intersections (e.g., while the ray-triangle intersection sub-unit of the RB-RT remains idle). In a second clock cycle in which the input BVH node contains triangles, the ray-triangle intersection sub-unit of the RB-RT can use the shared floating point logic sub-unit to perform a ray-triangle intersection (e.g., while the ray-AABB intersection sub-unit of the RB-RT remains idle). Shared ALU blocks, such as the shared floating point logic sub-unit, can improve performance and efficiency by reducing the physical area of the RTU ALU hardware logic.

In some aspects, for BVH nodes containing triangles (e.g., BVH leaf nodes, which can have up to four triangles), the compression process can include compressing a copy of the triangle geometry (e.g., coordinates describing a triangle) and including it in the resulting compressed BVH node. In some examples, the coordinates describing a triangle can be coordinates of the vertices of the triangle. By storing the triangle geometry directly within the BVH data structure itself, the RTU ALU can access and process the triangle geometry at the desired throughput of one node per clock, without having to wait one or more clock cycles for the triangle geometry to be retrieved from an external array or memory location.

Figure 5:
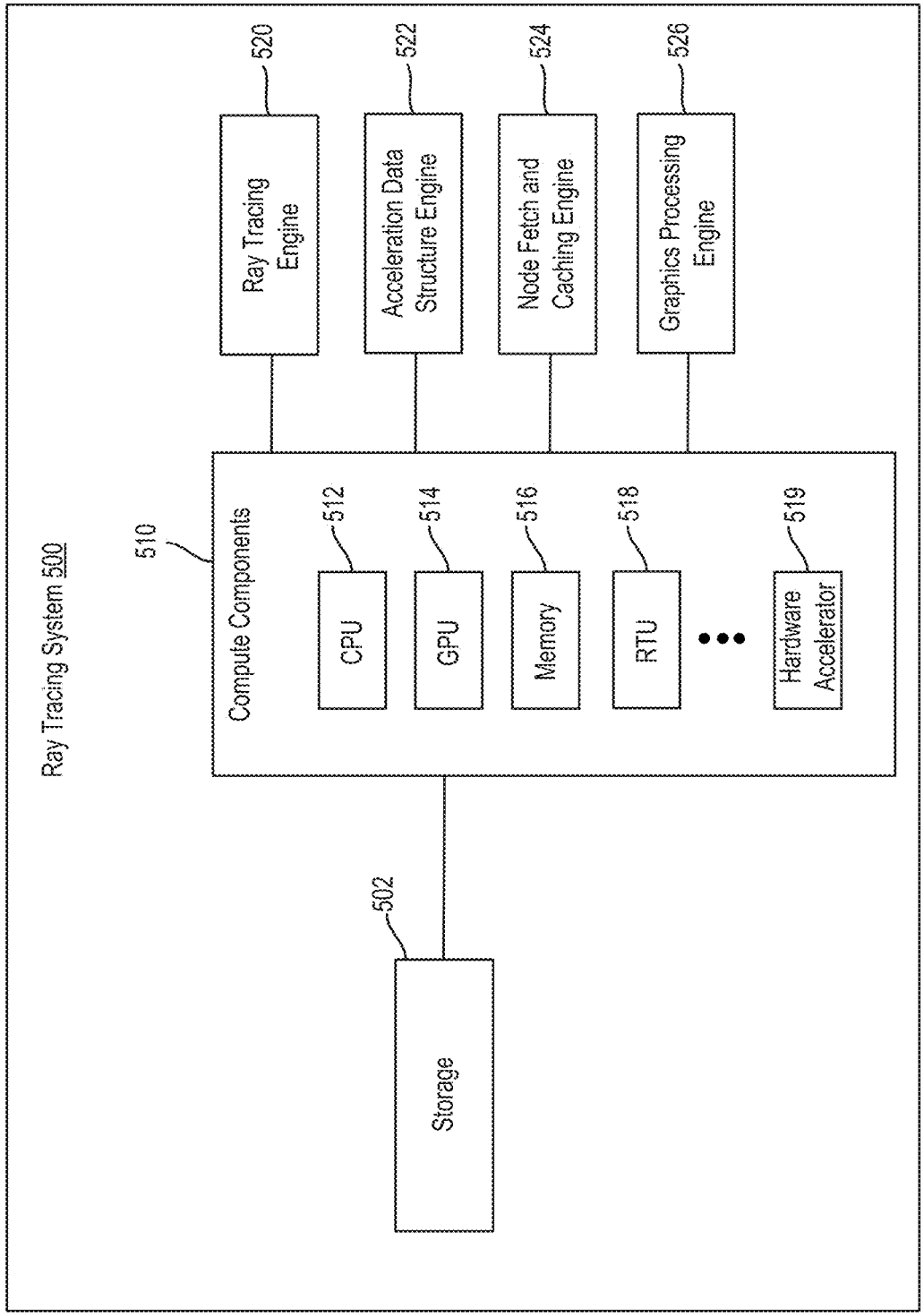
FIG. 5 is a simplified block diagram illustrating an example ray tracing system, in accordance with some examples of the present disclosure.

FIG. 5 is a diagram illustrating an example ray tracing system 500, in accordance with some examples of the disclosure. The ray tracing system 500 can implement the systems and techniques disclosed herein, including aspects described above and aspects associated with FIGS. 6-9. The ray tracing system 500 can perform various tasks and operations such as, for example, ray tracing tasks and operations (e.g., ray-primitive intersection, ray-bounding volume intersection, ray-triangle intersection, ray-AABB intersection, acceleration data structure construction and/or updating, rendering, etc.).

In the example shown in FIG. 5, the ray tracing system 500 includes storage 502, compute components 510, a ray tracing engine 520, an acceleration data structure engine 522, a node fetch and caching engine 524, and a graphics processing engine 526. It should be noted that the components 502 through 526 shown in FIG. 5 are non-limiting examples provided for illustration and explanation purposes, and other examples can include more, less, and/or different components than those shown in FIG. 5. For example, in some cases the ray tracing system 500 can include one or more display devices, one more other processing engines, one or more other hardware components, and/or one or more other software and/or hardware components that are not shown in FIG. 5. An example architecture and example hardware components that can be implemented by the ray tracing system 500 are further described below with respect to FIG. 11.

References to any of the components of the ray tracing system 500 in the singular or plural form should not be interpreted as limiting the number of such components implemented by the ray tracing system 500 to one or more than one. For example, references to a processor in the singular form should not be interpreted as limiting the number of processors implemented by the ray tracing system 500 to one. One of ordinary skill in the art will recognize that, for any of the components shown in FIG. 5, the ray tracing system 500 can include only one of such component(s) or more than one of such component(s).

The ray tracing system 500 can be part of, or implemented by, a single computing device or multiple computing devices. In some examples, the ray tracing system 500 can be part of an electronic device (or devices) such as a desktop computer, a laptop or notebook computer, a tablet computer, a set-top box, a smart television, a display device, a gaming console, a video streaming device, an IoT (Internet-of-Things) device, a smart wearable device (e.g., a head-mounted display (HMD), smart glasses, an extended reality (XR) device (e.g., a VR headset or had-mounted display (HMD), an AR headset, HMD, or glasses, etc.), or any other suitable electronic device(s).

In some implementations, the storage 502, compute components 510, ray tracing engine 520, acceleration data structure engine 522, node fetch and caching engine 524, and graphics processing engine 526 can be part of the same computing device. For example, in some cases, the storage 608, compute components 510, ray tracing engine 520, acceleration data structure engine 522, and graphics processing engine 526 can be integrated into a smartphone, laptop, tablet computer, smart wearable device, gaming system, and/or any other computing device. In other implementations, the storage 502, compute components 510, ray tracing engine 520, acceleration data structure engine 522, and graphics processing engine 526 can be part of two or more separate computing devices. For example, in some cases, some of the components 502 through 526 can be part of, or implemented by, one computing device and the remaining components can be part of, or implemented by, one or more other computing devices.

The storage 502 can be any storage device(s) for storing data. Moreover, the storage 502 can store data from any of the components of the ray tracing system 500. For example, the storage 502 can store data from the compute components 510, data from the ray tracing engine 520, data from the acceleration data structure engine 522, data from the node fetch and caching engine 524, and/or data from the graphics processing engine 526. In some examples, the storage 502 can include one or more buffers and/or caches for storing data for processing by the compute components 510. In some examples, the one or more buffers and/or caches can be general-use and available to some (or all) of the compute components 510. In some examples, the one or more buffers and/or caches can be provided specific to particular ones of the compute components 510.

The compute components 510 can include a central processing unit (CPU) 512, a graphics processing unit (GPU) 514, a memory 516, a Ray Tracing Unit 518, and/or one or more hardware accelerator components 519. In some implementations, the compute components 510 can include other processors or compute components, such as one or more digital signal processors (DSPs), one or more neural processing units (NPUs), and/or other processors or compute components. The compute components 510 can perform various operations such as ray-primitive intersection, ray-bounding volume intersection, ray-AABB intersection, acceleration data structure construction, acceleration data structure updating, scene rendering, rasterization, geometry processing, pixel processing, visibility processing, etc.

The operations for the ray tracing engine 520, the acceleration data structure engine 522, the node fetch and caching engine 524, and the graphics processing engine 526 (and any other processing engines) can be implemented by any of the compute components 510. In some cases, the operations of one or more of the ray tracing engine 520, the acceleration data structure engine 522, the node fetch and caching engine 524, and the graphics processing engine 526 can be executed by the CPU 512. In one illustrative example, the operations of one or more of the ray tracing engine 520, the acceleration data structure engine 522, the node fetch and caching engine 524, and the graphics processing engine 526 can be executed by the GPU 514. In some cases, the operations of one or more of the ray tracing engine 520, the acceleration data structure engine 522, the node fetch and caching engine 524, and the graphics processing engine 526 can be executed by the RTU 518.

In some cases, the operations of one or more of the ray tracing engine 520, the acceleration data structure engine 522, the node fetch and caching engine 524, and the graphics processing engine 526 can be executed by one or more combinations of CPU 512, GPU 514, and RTU 518. In some cases, the compute components 110 can include other electronic circuits or hardware, computer software, firmware, or any combination thereof, to perform any of the various operations described herein.

In some examples, the ray tracing engine 520 can include one or more ray tracing Application Programming Interfaces (APIs). In one example, the ray tracing engine 520 can include one or more ray intersection engines. For example, ray tracing engine 520 can include one or more ray-primitive intersection engines and/or can include one or more ray-bounding volume intersection engines. In some cases, ray tracing engine 520 can include one or more ray-triangle intersection engines and/or can include one or more ray-AABB intersection engines. In some examples, the ray tracing engine 520 can implement one or more ray intersection engines using one or more hardware-accelerated ray tracing units (RTUs) and/or arithmetic logic units (ALUs).

In one illustrative example, the ray tracing engine 520 can communicate with RTU 518 to perform ray-primitive (e.g., ray-triangle) intersections and/or ray-bounding volume (e.g., ray-AABB) intersections. For example, in some cases the ray tracing engine 520 can provide one or more inputs and/or control signals to RTU 518. RTU 518 can use the inputs and control signals from ray tracing engine 520 to perform ray-primitive intersections and/or ray-bounding volume intersections and can communicate the ray intersection results back to ray tracing engine 520.

In some examples, the acceleration data structure engine 522 can construct or generate one or more acceleration data structures. The acceleration data structures generated by acceleration data structure engine 522 can be used by one or more of ray tracing engine 520, the node fetch and caching engine 524, and graphics processing engine 526. In one illustrative example, acceleration data structure engine 522 can construct or generate a Bounding Volume Hierarchy (BVH). In some cases, acceleration data structure engine 522 can generate two-level acceleration structures (e.g., an acceleration data structure including a TLAS and one or more BLASs). The acceleration data structure engine 522 can be implemented using the CPU 512, the GPU 514, or a combination of the two. In some examples, the acceleration data structure engine 522 can additionally, or alternatively, be implemented using one or more of the dedicated hardware accelerator components 519.

In some examples, the graphics processing engine 526 can include a graphics processing pipeline. For example, graphics processing engine 526 can include, but is not limited to, one or more of a geometry processing stage, a visibility stage, a rasterization stage, and a pixel processing pipeline. In some examples, graphics processing engine 526 can communicate with or access the memory 516 of the compute components 510. Memory 516 can include one or more of a system memory, a frame buffer, a graphics memory, one or more caches, etc. In some examples, graphic processing engine 526 can communicate with one or more of the RTU 518 (e.g., of the compute components 510) and/or the ray tracing engine 520.

In some cases, the ray tracing system 500 (e.g., using the ray tracing engine 520, the acceleration data structure engine 522, the node fetch and caching engine 524, and/or the graphics processing engine 526) can obtain an acceleration data structure that includes one or more primitives of a scene object. For example, the ray tracing system 500 can obtain the acceleration data structure from storage 502 and/or memory 516. In some cases, the acceleration data structure can be generated or constructed using the acceleration data structure engine 522.

The acceleration data structure engine 522 can obtain one or more representations of a scene object or other scene geometry and generate and/or update a BVH or other acceleration data structure that includes the scene object or scene geometry. In some examples, the acceleration data structure engine 522 can obtain representations of a scene object or other scene geometry at least in part from one or more of the storage 502 and the memory 516. In some cases, the acceleration data structure engine 522 can obtain representations of a scene object or other scene geometry from the ray tracing engine 520 (and/or one or more of the compute components 510).

The acceleration data structure engine 522 can operate over representations of scene objects and scene geometry using both object-space representations and world-space representations. In some examples, the acceleration data structure engine 522 can use one or more Object-To-World matrices and/or World-To-Object matrices to transform scene objects/geometry from object-space representations into world-space representations, and from world-space representations to object-space representations, respectively.

Figure 6:
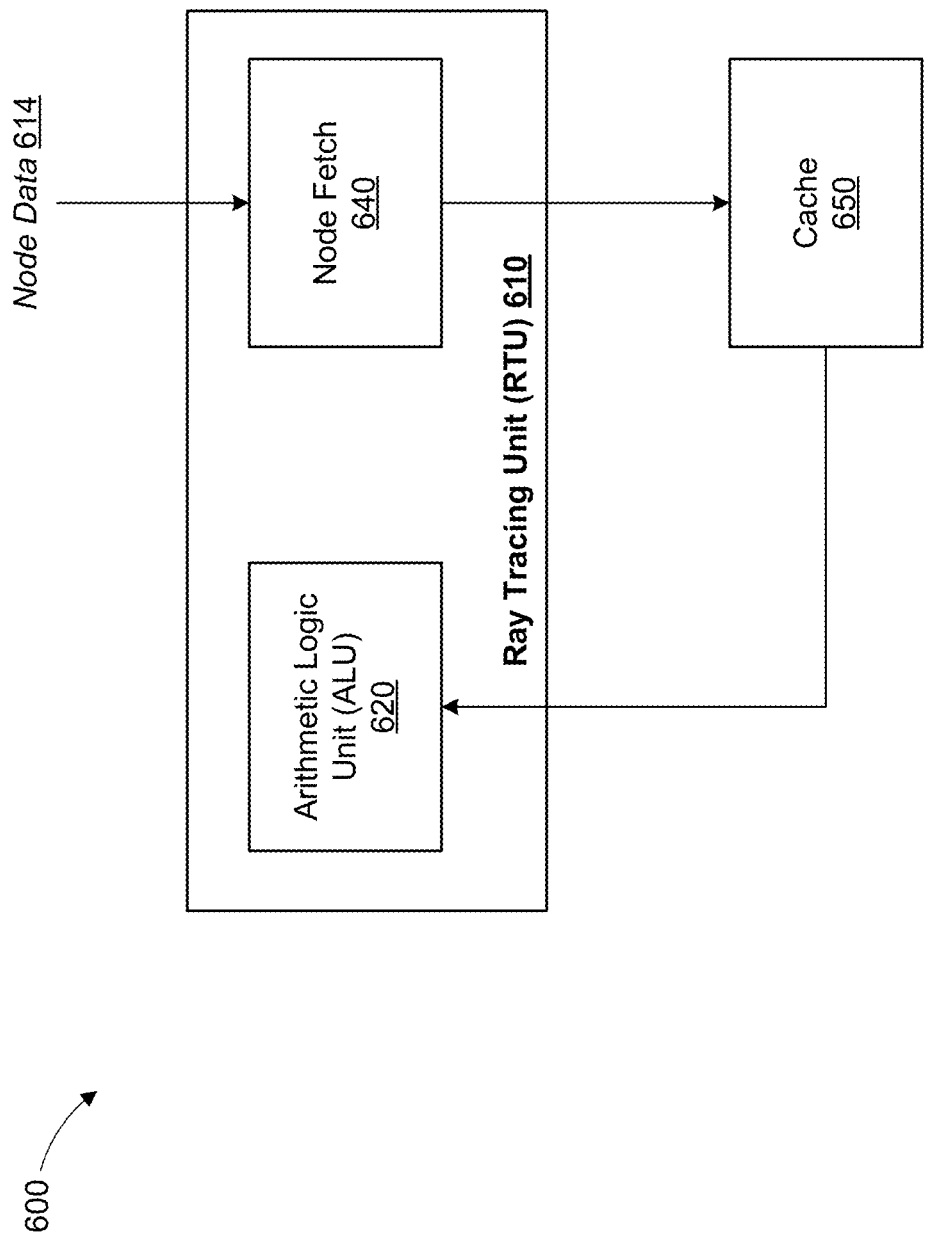
FIG. 6 illustrates an example Ray Tracing Unit (RTU), in accordance with some examples of the present disclosure.

FIG. 6 is a diagram 600 illustrating an example Ray Tracing Unit (RTU) 610, in accordance with some examples of the present disclosure. As illustrated, RTU 610 includes at least an arithmetic logic unit (ALU) 620 and a node fetch unit 640. A cache 650 can be communicatively coupled between ALU 620 and node fetch unit 640. As illustrated, the cache 650 can be external to RTU 610. In some examples, cache 650 can be included in RTU 610 and/or ALU 620.

RTU 610 can use node fetch unit 640 to obtain node data 614 of one or more nodes stored in an acceleration data structure. For example, RTU 610 can use node fetch unit 640 to obtain node data 614 that includes data of one or more BVH nodes, as will be explained in greater depth below. Based at least in part on the node data 614, RTU 610 can perform one or more ray tracing operations. For example, RTU 610 can perform one or more ray intersection tests (also referred to herein as ray intersection calculations) to determine if a given ray intersects with at least a portion of the acceleration data structure node represented by node data 614. In one illustrative example, RTU 610 can use the node data 614 obtained by node fetch unit 640 to write or otherwise store one or more acceleration data structure nodes in the cache 650.

RTU 610 can perform one or more ray intersection calculations for the nodes stored in cache 650. For example, RTU 610 can use ALU 620 to read a node from cache 650 and perform the one or more ray intersection calculations. In some examples, RTU 610 can use ALU 620 to calculate ray-primitive (e.g., ray-triangle) intersections and/or to calculate ray-bounding volume (e.g., ray-AABB) intersections, as have been described previously.

Figure 8A:
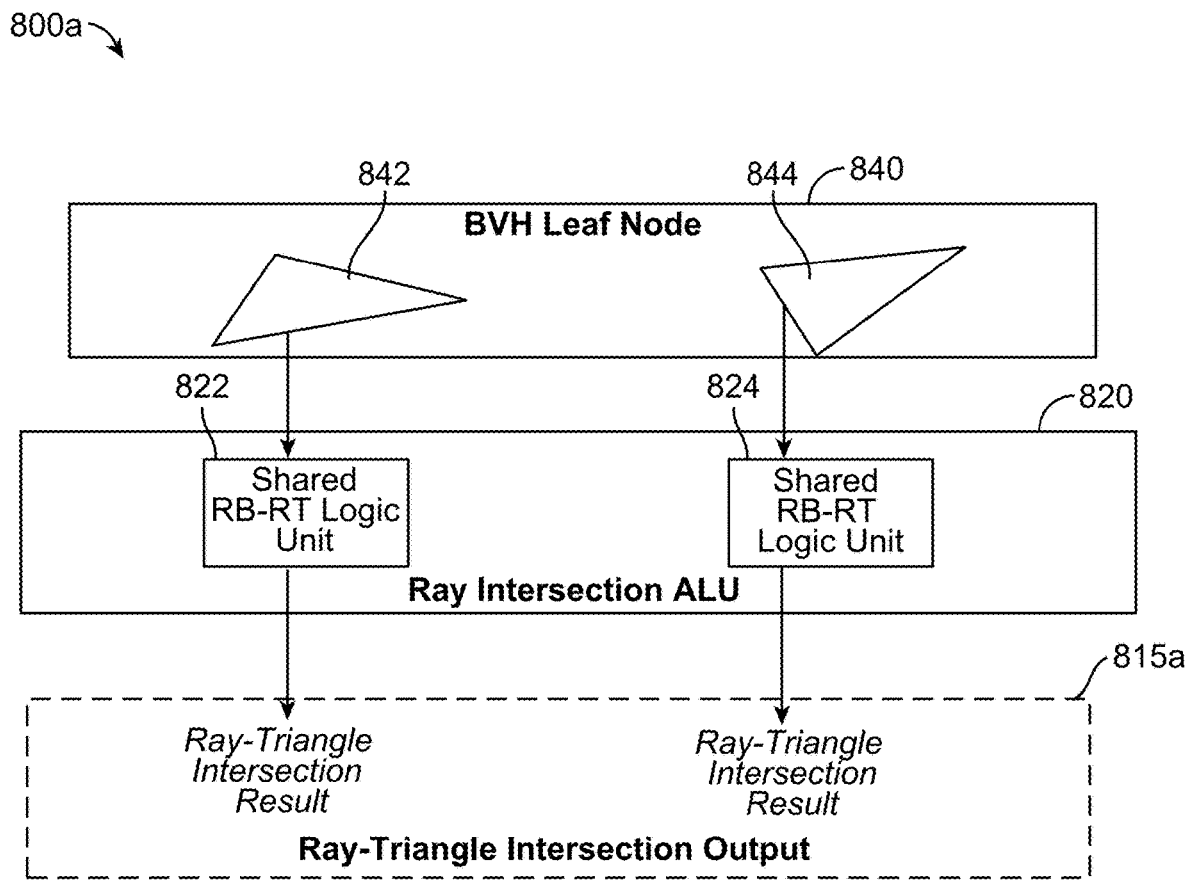
FIG. 8A is a diagram illustrating a ray intersection ALU that determines one or more ray-triangle intersection outputs from an input acceleration data structure node that includes triangles, in accordance with some examples of the present disclosure.
Figure 8B:
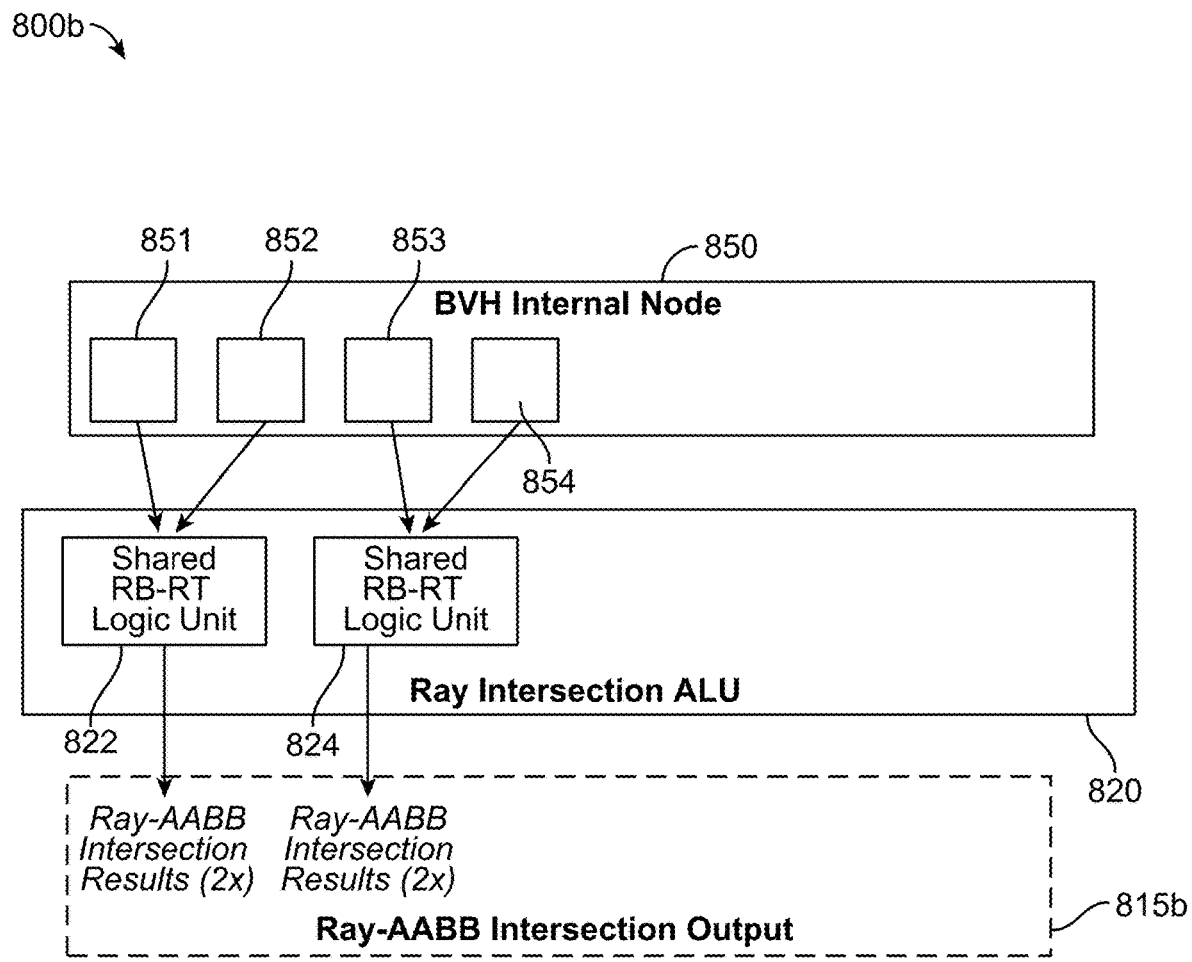
FIG. 8B is a diagram illustrating the ray intersection ALU of FIG. 8A determining one or more ray-bounding volume intersection outputs from an input acceleration data structure node that includes bounding volumes, in accordance with some examples of the present disclosure.

In some examples, ALU 620 can be the same as or similar to the ALU 820 illustrated in FIGS. 8A and 8B, as will be described in greater depth below (e.g., FIG. 8A depicts ALU 820 calculating ray-triangle intersections for an input node that includes one or more triangles and FIG. 8B depicts the same ALU 820 calculating ray-AABB intersections for an input node that includes one or more AABBs). In some examples, RTU 620 can be the same as or similar to the RTU 518 illustrated in the ray tracing system 500 of FIG. 5. In some cases, node fetch unit 640 can be the same as or similar to the node fetch and caching engine 524 illustrated in the ray tracing system 500 of FIG. 5.

In one illustrative example, RTU 610 can perform one ray-node intersection calculation per clock, as noted above. For example, in a first clock cycle ALU 620 can read an acceleration data structure node from cache 650 and calculate ray-triangle intersections if the node includes triangles or calculate ray-AABB intersections if the node includes AABBs. At the end of the first clock cycle, ALU 620 can subsequently provide as output the results of the ray-triangle intersection calculations or the ray-AABB intersection calculations. In a second (and any further) clock cycles, ALU 620 can repeat the process above for additional nodes that are read from cache 650.

In some examples, RTU 610 can use node fetch unit 640 to fetch acceleration data structure nodes into cache 650 concurrently with the ray intersection calculations that are being performed by ALU 620. For example, RTU 610 can use node fetch unit 640 to fetch or otherwise write (or store) at least one acceleration data structure node to cache 650 per clock cycle. In some cases, RTU 610 can use node fetch unit 640 to fetch acceleration data structure nodes into cache 650 asynchronously with the ray intersection calculations performed by ALU 620. For example, RTU 610 can use node fetch unit 640 to write acceleration data structure nodes to cache 650 in batches that are spaced apart by a time interval greater than one clock cycle. In some examples, RTU 610 can use node fetch unit 640 to write acceleration data structure nodes to cache 650 at a variable interval that ensures cache 650 remains populated with node data and/or that ALU 620 remains fed with node data for every clock cycle.

In some cases, RTU 610 can perform one ray-node intersection per clock based on receiving constant-sized nodes of an acceleration data structure (e.g., a BVH). For example, each node of the constant-sized nodes of the acceleration data structure can include the same number of bytes. In some aspects, RTU 610 can use node fetch unit 640 to write or otherwise store constant-sized acceleration data structure nodes to cache 650. In one illustrative example, the constant-sized acceleration data structure nodes can be cache line-aligned with cache 650. For instance, if cache 650 has a 64-byte cache line, RTU 610 can use node fetch unit 640 to write constant-sized 64-byte acceleration data structure nodes to cache 650. In some cases, when the constant-sized acceleration data structure nodes are cache line-aligned with cache 650, the size (e.g., number of bytes) of cache 650 can be an integer multiple of the constant size (e.g., number of bytes) of the acceleration data structure nodes.

By writing constant-sized, cache line-aligned nodes to cache 650, RTU 610 can minimize or eliminate idle or wasted clock cycles at the ALU 620. For example, by using a 64-byte cache line-aligned node size, ALU 620 can avoid scenarios where the node data needed to perform a ray-node intersection calculation spills over onto one or more additional cache lines within cache 650 (e.g., ALU 620 can avoid scenarios in which the input node data needed by ALU 620 occupies two or more cache lines within cache 650). In scenarios in which RTU 610 and/or ALU 620 can read only one cache line from cache 650 per clock, a non-cache line-aligned node data can result in ALU 620 remaining idle for the number of additional clock cycles that are needed to finish reading the node data from cache 650. In some examples, clock cycles where the ALU 620 is idle may be wasted or inefficient clock cycles (e.g., when ALU 620 is available to perform a ray-node intersection calculation but does not yet have the complete node data needed to perform the ray-node intersection calculation).

Figure 7:
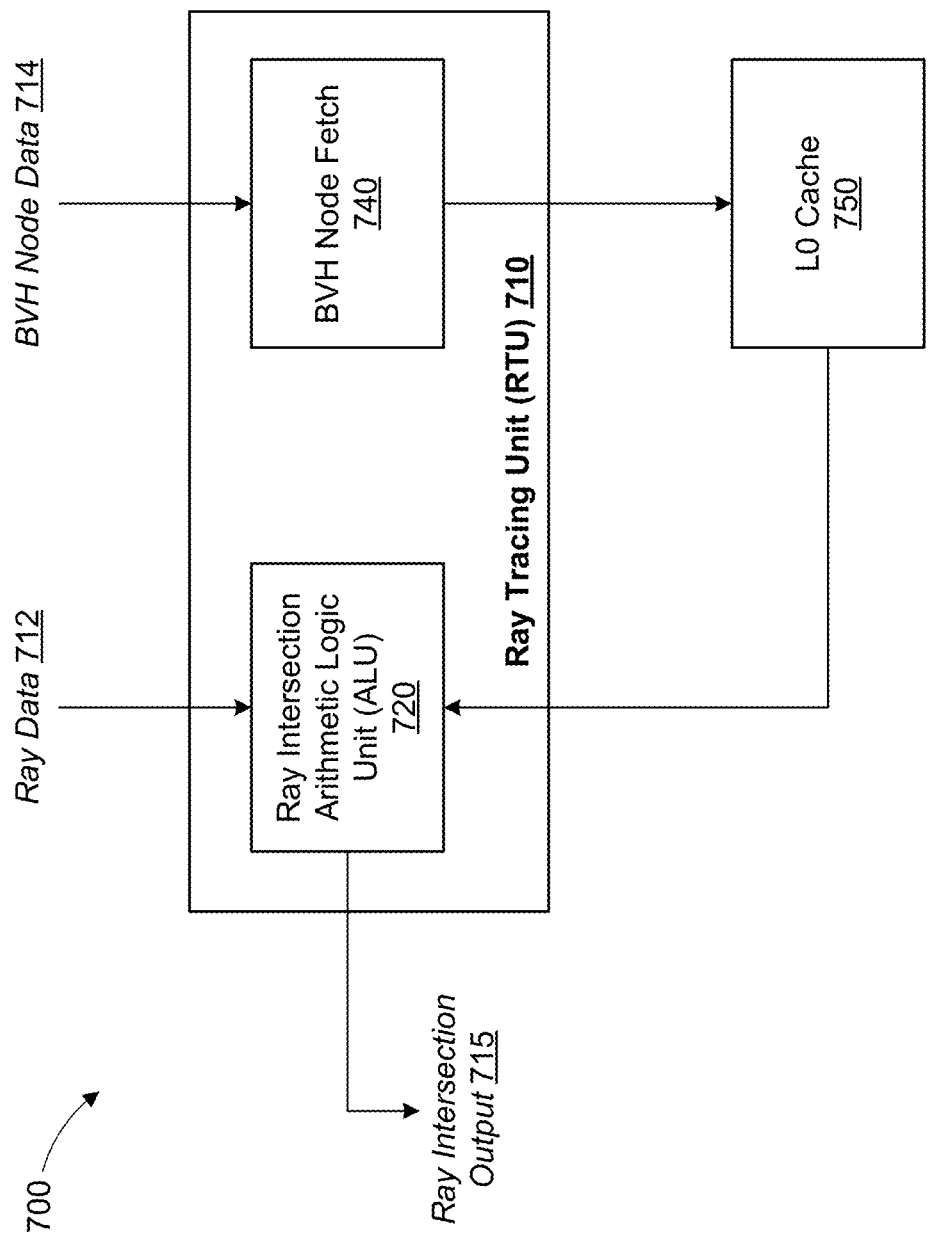
FIG. 7 illustrates an example RTU including a ray intersection arithmetic logic unit (ALU), in accordance with some examples of the present disclosure.

FIG. 7 is a diagram 700 illustrating an example RTU 710, in accordance with some examples of the present disclosure. In some cases, RTU 710 (and components thereof) can be similar to the RTU 610 (and components thereof) of FIG. 6, and some or all of the description provided above with respect to RTU 610 can apply to RTU 710. As illustrated, RTU 710 includes at least a ray intersection ALU 720 and a BVH node fetch unit 740. A Level 0 (L0) cache 750 can be communicatively coupled between ray intersection ALU 720 and BVH node fetch unit 740. In one illustrative example, L0 cache 750 can be an L0 cache of RTU 710. L0 cache 750 can be included in RTU 710 and/or ray intersection ALU 720. In some cases, L0 cache 750 can be external to RTU 710 and/or ray intersection ALU 720. In some examples, RTU 710 can be communicatively coupled (e.g., directly or indirectly) to one or more caches of a GPU that includes RTU 710. For example, when RTU 710 is included in a GPU or other ray tracing system, the GPU can include a plurality of caches arranged in a hierarchical fashion, wherein the one or more GPU caches are above an RTU cache (e.g., RTU L0 cache) in the hierarchy. In such an example, data can initially be stored in the one or more GPU caches above the RTU cache, and the RTU cache (e.g., RTU L0 cache) can subsequently obtain input data of BVH nodes from a communicative chain that includes the one or more GPU caches.

As illustrated, BVH node fetch unit 740 can obtain BVH node data 714 of a BVH acceleration data structure. In some cases, BVH node fetch unit 740 can obtain the BVH node data 714 from the acceleration data structure engine 522 of the ray tracing system 500 of FIG. 5. In some examples, BVH node fetch unit 740 can obtain the BVH node data from the node fetch and caching engine 524 of the ray tracing system 500 of FIG. 5. FIG. 7 also depicts a ray data 712 that is provided to or otherwise obtained by one or more of ray intersection ALU 720 and/or RTU 710. The ray data 712 can be associated with a given ray that is to be intersected against one or more BVH nodes. For example, ray intersection ALU 720 can intersect the ray data 712 against one or more BVH nodes stored in the L0 cache 750. The one or more BVH nodes stored in the L0 cache 750 can be included in the BVH node data 714 or otherwise determined (e.g., by BVH node fetch unit 740) based on the BVH node data 714. In some examples, the ray data 712 can be obtained from the ray tracing engine 520 of the ray tracing system 500 of FIG. 5.

RTU 710 can use the ray intersection ALU 720 to generate or calculate one or more ray intersection outputs 715. The ray intersection output 715 can include one or more ray-triangle intersection results (e.g., when ray intersection ALU 720 reads a BVH node containing triangle primitives from L0 cache 750) or can include one or more ray-AABB intersection results (e.g., when ray intersection ALU 720 reads a BVH node containing AABBs from L0 cache 750), as will be explained in greater depth below.

For example, FIGS. 8A and 8B illustrate an example ray intersection ALU 820 that can generate a ray-triangle intersection output 815*a* (e.g., FIG. 8A) and a ray-AABB intersection output 815*b* (e.g., FIG. 8B). In one illustrative example, the ray intersection ALU 820 shown in FIGS. 8A and 8B can be the same as or similar to one or more of the ALU 620 of FIG. 6 and/or the ray intersection ALU 720 of FIG. 7. The ray intersection ALU 820 can include a plurality of shared RB-RT (Ray-Box, Ray-Triangle) logic units, shown here as shared RB-RT logic units 822 and 824. In some examples, a greater number of shared RB-RT logic units (e.g., four) can be included in ray intersection ALU 720, wherein the additional shared RB-RT logic units are the same as or similar to the shared RB-RT logic units 822 and 824.

Figure 9:
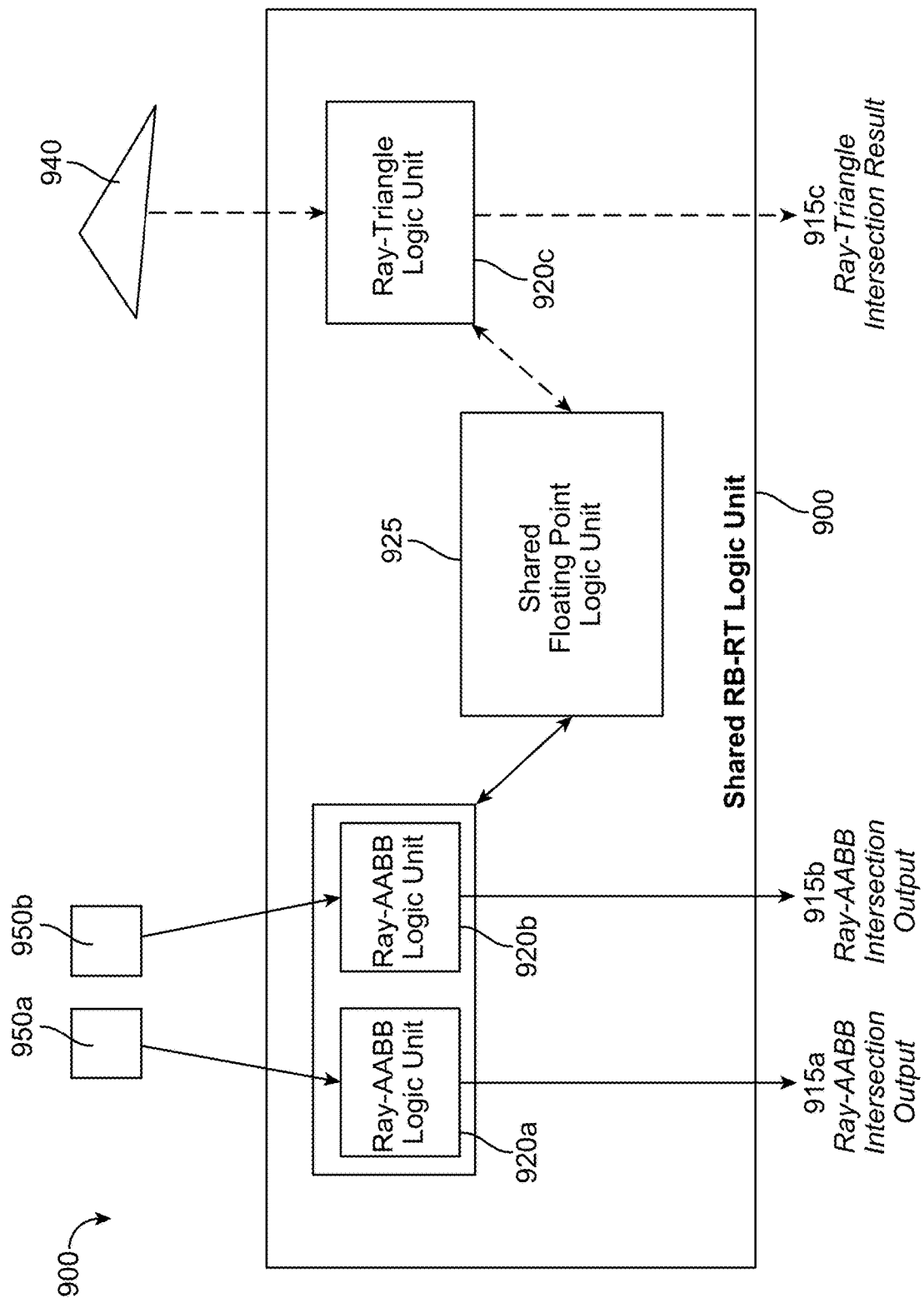
FIG. 9 is a diagram illustrating a shared Ray-Box, Ray-Triangle (RB-RT) logic unit, in accordance with some examples of the present disclosure.

As will be explained in greater depth below, the shared RB-RT logic units 822 and 824 can each include a shared ALU logic that allows each shared RB-RT logic unit to perform both ray-triangle intersection calculations (e.g., as in FIG. 8A) and ray-AABB intersection calculations (e.g., as in FIG. 8B). An example RB-RT 900 is illustrated in FIG. 9 and will be described in greater depth below. In some examples, one or more of the shared RB-RT logic units 822 and 824 of FIGS. 8A and 8B can be the same as or similar to the shared RB-RT logic unit 900 of FIG. 9.

FIG. 8A is a diagram 800*a* depicting a scenario in which ray intersection ALU 820 generates a ray-triangle intersection output 815*a*. In some examples, ray intersection ALU 820 can generate the ray-triangle intersection output 815*a* based on receiving as input a BVH leaf node 840 that includes a plurality of triangle primitives (e.g., triangles 842 and 844). In some cases, when ray intersection ALU 820 includes a greater number of shared RB-RT logic units (e.g., four), ray intersection LAU 820 can generate the ray-triangle intersection output 815*a* based on receiving as input a BVH leaf node 840 that includes a corresponding number (e.g., four) of triangle primitives. In one illustrative example, the BVH leaf node 840 can be the same as or similar to the BVH leaf node 481 illustrated in the acceleration data structure 400*b* (e.g., a BVH) of FIG. 4B. In some cases, the triangles 842 and 844 can be the same as or similar to the triangles 481*a*-481*b* illustrated in the acceleration data structure 400*b* of FIG. 4B.

In one illustrative example, FIG. 8A can depict a scenario in which one or more of the ALUs 620 and 720 (e.g., which can be the same as the ray intersection ALU 820) is used to perform a ray-triangle intersection calculation for the BVH leaf node 481 of the acceleration data structure 400*b* (e.g., a BVH) of FIG. 4B (e.g., which can be the same as the BVH leaf node 840). For example, the ray-triangle intersection calculation of FIG. 8A could be performed in response to the ray tracing system 500 of FIG. 5 reaching the BVH leaf node 481 in the course of traversing acceleration data structure 400*b* to perform ray tracing operations.

As mentioned previously, and as will be described in greater detail with respect to the example architecture of the shared RB-RT logic unit depicted in FIG. 9, each of the shared RB-RT logic units 822 and 824 can be sized to perform a ray-triangle intersection calculation for one triangle per clock cycle (each of the shared RB-RT logic units 822 and 824 can also perform ray-AABB intersection calculations for two AABBs per clock cycle, as will be described with respect to FIG. 8B).

Ray intersection ALU 820 is depicted as including two shared RB-RT logic units 822 and 824 and can therefore perform ray-triangle intersection calculations for two triangles per clock cycle. In some examples, ray intersection ALU 820 can include a greater or lesser number (e.g., four) of the shared RB-RT logic units 822 and 824 and can perform ray-triangle intersection calculations for a greater or lesser number (e.g., four) of triangles per clock cycle. In some cases, one or more of the shared RB-RT logic units 822 and 824 can be configured (e.g., sized) to perform more than one ray-triangle intersection calculation per clock cycle. For example, if the shared RB-RT logic units can perform ray-triangle intersection calculations for two triangles per clock cycle, then ray intersection ALU 820 could fully process the two triangles 842 and 844 of the input BVH leaf node 840 using the two shared RB-RT logic units 822 and 824. In examples where ray intersection ALU 820 includes a greater number (e.g., four) of the shared RB-RT Logic units 822 and 824, then ray intersection ALU 820 could fully process the two triangles 842 and 844 of the input BVH leaf node 840 using only two of the four shared RB-RT logic units.

In one illustrative example, ray intersection ALU 820 can receive the BVH leaf node 840 as input and use the shared RB-RT logic units 822 and 824 to perform ray-triangle intersection calculations for the triangles 842 and 844 in parallel. In some cases, the ray intersection ALU 820 can perform the two ray-triangle intersection calculations in parallel in a single (e.g., the same) clock cycle, as mentioned previously.

For the triangles 842 and 844 provided as the respective inputs to the shared RB-RT logic units 822 and 824, the shared RB-RT logic units 822 and 824 can each perform a ray-triangle intersection calculation and generate a corresponding ray-triangle intersection result. As illustrated in FIG. 8A, the ray-triangle intersection results determined by the shared RB-RT logic units 822 and 824 can be combined into a ray-triangle intersection output 815a. In some cases, the ray-triangle intersection results can be sorted within the ray-triangle intersection output 815a. For example, the ray-triangle intersection results can be compared and sorted by their t-values (e.g., with a lower t-value indicating that a triangle is closer to the ray origin/intersected by the ray before a different triangle with a higher t-value) before being provided in the ray-triangle intersection output 815a.

FIG. 8B is a diagram 800b depicting a scenario in which ray intersection ALU 820 (e.g., which is the same as the ray intersection ALU 820 of FIG. 8A) receives as input a BVH internal node 850 including a plurality of AABBs 851-854. Based on receiving a BVH node containing AABBs, ray intersection ALU 820 generates a ray-AABB intersection output 815b. It is noted that FIG. 8B illustrates an example in which the ray intersection ALU 820 generates the ray-AABB intersection output 815b by performing four ray-AABB intersection calculations (e.g., based on receiving as input the four AABBs 851-854851-854 of BVH internal node 850). In some examples, the ray intersection ALU 820 can receive as input a greater number (e.g., eight) of AABBs and can generate the ray intersection output 815b to include a correspondingly greater (e.g., eight) number of ray-AABB intersection calculations. In some aspects, when the ray intersection ALU 820 receives as input a greater number (e.g., eight) of AABBs, the ray intersection ALU can include a greater number (e.g., four) of the shared RB-RT logic units 822 and 824. In some examples, the ray intersection ALU 820 can receive as input a lesser number of AABBs and can generate the ray-AABB intersection output 815b to include a correspondingly lesser number of ray-AABB intersection calculations.

For example, BVH internal node 850 is shown as including four AABBs 851-854, but in some cases could include less than four AABBs or more than four AABBs (e.g., eight AABBs). BVH internal node 850 could include a different number of AABBs could occur when BVH internal node 850 is obtained from a BVH or other acceleration data structure with a branching factor other than four (e.g., because the branching factor determines the maximum number of child nodes that can be associated with a given internal node). In some cases, BVH internal node 850 could include less than four AABBs even if the branching factor is four (e.g., because a branching factor of four indicates is the maximum number of child nodes per internal node, rather than a minimum).

In some examples, the ray intersection ALU 820 can receive as input a lesser number of AABBs when a BVH leaf node is provided to the ray intersection ALU 820. As illustrated in FIG. 8B, ray intersection ALU 820 receives the AABBs 851-854 from an internal (e.g., non-leaf) BVH node. In some examples, the BVH internal node 850 received by ray intersection ALU 820 can be the same as or similar to one or more of the BVH internal nodes 471-478 (and/or the BVH root node 470) depicted in FIG. 4B. In one illustrative example, BVH internal nodes (such as BVH internal node 850) may contain four or more AABBs and BVH leaf nodes may contain two or more AABBs, in which case ray intersection ALU 820 can generate the ray-AABB intersection output 815b to include a corresponding two or more ray-AABB intersection results.

In some aspects, BVH internal nodes can have a larger maximum number of AABBs than BVH leaf nodes based at least in part on the fact that the ray intersection ALU 820 receives constant-sized (e.g., 64-byte) BVH nodes that are cache line-aligned with a cache that feeds ALU 820 (e.g., cache 650 and/or L0 cache 750). In some examples, the ray intersection ALU 820 can receive constant-sized (e.g., 64-byte) BVH nodes that are cache line-aligned with one or more GPU caches. The one or more GPU caches can be associated with the RTU and/or the ALU 820 by way of the one or more GPU caches being used to feed an RTU cache (e.g., RTU L0 cache).

As mentioned previously, and as will be described in greater detail with respect to the example architecture of the shared RB-RT logic unit depicted in FIG. 9, each of the shared RB-RT logic units 822 and 824 can be sized to perform a ray-AABB intersection calculation for two AABBs per clock cycle. For example, when ray intersection ALU 820 receives as input the BVH internal node 850 containing the AABBs 851-854, each of the shared RB-RT logic units 822 and 824 can perform ray-AABB calculations for two of the four AABBs 851-854 (e.g., as illustrated in FIG. 8B).

In some examples, when ray intersection ALU 820 receives as input a BVH node containing less than four AABBs, then one or more of the shared RB-RT logic units 822 and 824 can perform ray-AABB calculations for only one AABB and/or can perform no ray-AABB calculations for the input BVH node.

In one illustrative example, ray intersection ALU 820 can receive as input a BVH node containing four or more AABBs and can use the two or more shared RB-RT logic units 822 and 824 to perform ray-AABB intersection calculations in parallel for the four or more AABBs. In some cases, the ray intersection ALU 820 can perform the four or more ray-AABB intersection calculations in parallel in a single (e.g., the same) clock cycle, as mentioned previously.

In the context of the example of FIG. 8B, for the AABBs 851-854 provided as the respective inputs to the shared RB-RT logic units 822 and 824, the shared RB-RT logic units 822 and 824 can each perform two ray-AABB intersection calculations and generate a corresponding two ray-AABB intersection results. As illustrated in FIG. 8B, the four ray-AABB intersection results determined by the shared RB-RT logic units 822 and 824 can be combined into a ray-AABB intersection output 815b. In some cases, the ray-AABB intersection results can be sorted within the ray-AABB intersection output 815b. For example, the ray-triangle intersection results can be compared and sorted by their t-values (e.g., with a lower t-value indicating that a given AABB is closer to the ray origin/intersected by the ray before a different AABB with a higher t-value) before being provided in the ray-AABB intersection output 815b.

FIG. 9 is a diagram illustrating an example architecture of a shared RB-RT logic unit 900, in accordance with some examples of the present disclosure. As mentioned previously, in some examples the shared RB-RT logic unit 900 can be used to implement one or more of the shared RB-RT logic units 822 and 824 depicted in the ray intersection ALU 820 of FIGS. 8A and 8B. In some examples, the shared RB-RT logic unit 900 can be implemented in one or more of ALU 620 and/or ALU 720, depicted in FIG. 6 and FIG. 7, respectively.

As illustrated, the shared RB-RT logic unit 900 includes two ray-AABB logic units 920a and 920b, which can each perform a ray-AABB intersection calculation (e.g., as has been described above) using as input the AABBs 950a and 950b, respectively. The two ray-AABB logic units 920a and 920b can generate two ray-AABB intersection outputs 915a and 915b, respectively. In some examples, the two ray-AABB intersection outputs 915a and 915b can be the same as the two ray-AABB intersection outputs depicted in FIG. 8B as being generated by each of the shared RB-RT logic units 822 and 824 (e.g., which can be the same as or otherwise implement the example architecture of the shared RB-RT logic unit 900) for an input BVH node including the AABBs 851-854

The shared RB-RT logic unit 900 can further include one ray-triangle logic unit 920c, which can perform a ray-triangle intersection calculation (e.g., as has also been described above) using as input the triangle geometric primitive 940. The ray-triangle logic unit 920c can generate a ray-triangle intersection output 915c. In some examples, the ray-triangle intersection output 915c can be the same as the ray-triangle intersection output depicted in FIG. 8A as being generated by each of the shared RB-RT logic units 822 and 824 (e.g., which can be the same as or otherwise implement the example architecture of the shared RB-RT logic unit 900) for an input BVH node including the triangles 842 and 844.

The shared RB-RT logic unit 900 can further include a shared floating point logic unit 925. In one illustrative example, the shared floating point logic unit 925 can be a floating point ALU that is common to (e.g., shared by) both the ray-AABB intersection calculations performed by the ray-AABB logic units 920a and 920b, and the ray-triangle intersection calculations performed by the ray-triangle logic unit 920c.

In some examples, the shared floating point logic unit 925 can be used by RB-RT 900 to perform floating point ALU operations that are common to the ray-AABB logic units 920a, 920b and to the ray-triangle logic unit 920c. For example, in a first clock cycle in which the input BVH node contains AABBs, the two ray-AABB logic units 920a and 920b of RB-RT 900 can use the shared floating point logic unit 925 to perform ray-AABB intersection calculations. In this case, the ray-AABB logic units 920a, 920b and the shared floating point logic unit 925 are active within RB-RT 900 while the ray-triangle logic unit 920c remains idle for the first clock cycle.

In a second (or later) clock cycle in which the input BVH node contains triangles rather than AABBs, the ray-triangle logic unit 920c of the RB-RT 900 can use the shared floating point logic unit 925 to perform a ray-triangle intersection calculation. In this case, the ray-triangle logic unit 920c and the shared floating point logic unit 925 are active within RBRRT 900 while the two ray-AABB logic units 925a and 925b remain idle for the second clock cycle. Shared ALU blocks, such as the shared floating point logic unit 925, can improve the performance and efficiency of the RB-RT logic unit 900 (and an ALU and/or RTU that includes RB-RT 900) by reducing the physical area of the RTU ALU hardware logic and permitting greater parallelism to be achieved for a given chip or die area in which the presently disclosed RTU can be implemented.

For example, as described previously, the shared RB-RT logic unit 900 can be used to perform two ray-AABB intersection calculations per clock or can be used to perform one ray-triangle intersection per clock. In some examples, this 2:1 ratio matches the 4:2 (and/or 8:4) ratio of maximum input sizes expected for AABBs and triangles, respectively, that may be included in an input BVH node provided to an ALU containing a plurality of instances of the shared RB-RT logic unit 900. Therefore, in some examples, using two or more instances of the shared RB-RT logic unit 900, one or more of the RTUs and/or ALUs described herein can completely ingest and process any of the possible decompressed BVH node contents received as input.

Figure 10:
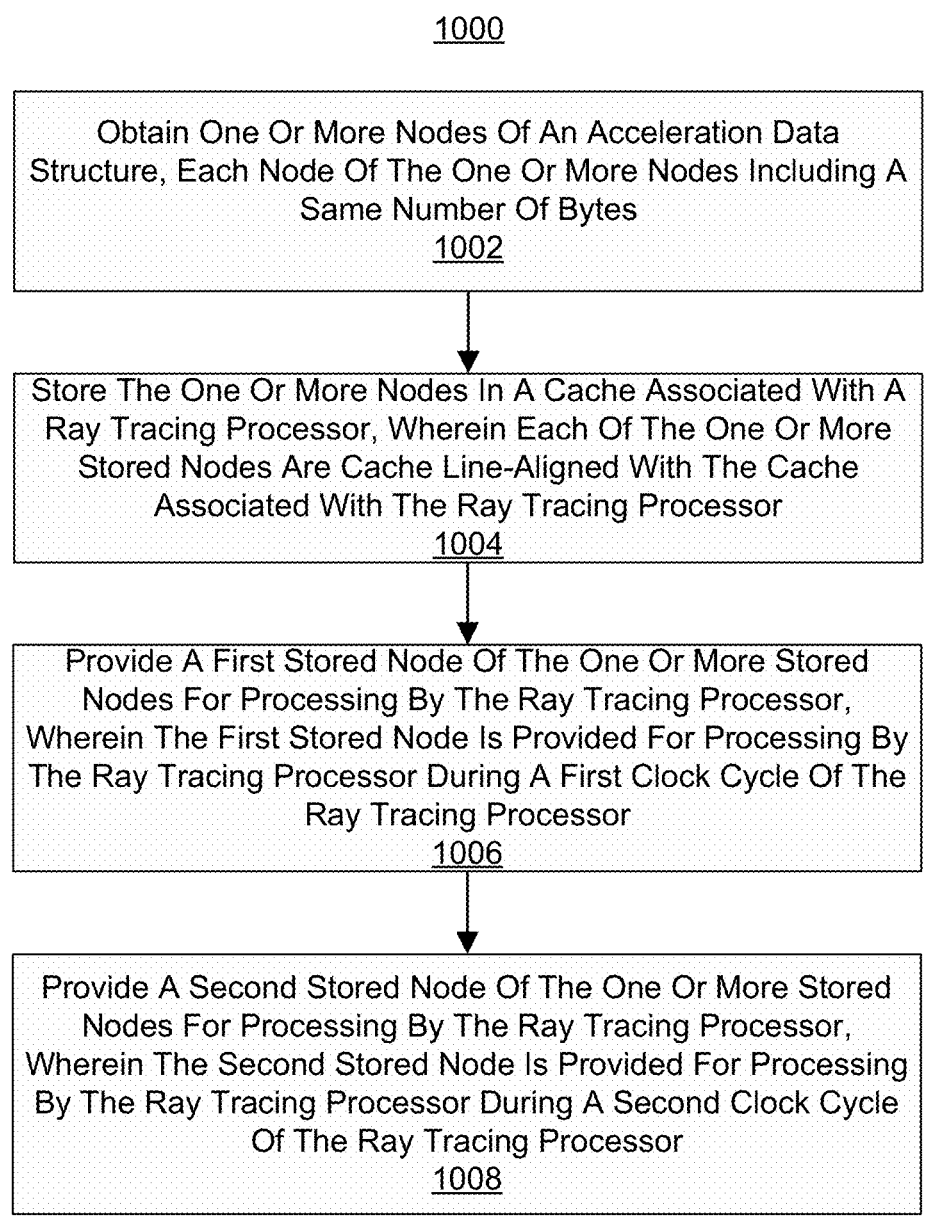
FIG. 10 is a flow diagram illustrating an example of a process for graphics processing, in accordance with some examples of the present disclosure.

FIG. 10 is a flowchart illustrating an example of a process 1000 for graphics processing. Although the example process 1000 depicts a particular sequence of operations, the sequence may be altered without departing from the scope of the present disclosure. For example, some of the operations depicted may be performed in parallel or in a different sequence that does not materially affect the function of the process 1000. In other examples, different components of an example device or system that implements the process 1000 may perform functions at substantially the same time or in a specific sequence.

At block 1002, the process 1000 includes obtaining one or more nodes of an acceleration data structure. Each node of the one or more nodes includes a same number of bytes. In one illustrative example, the acceleration data structure can be obtained by or from the acceleration data structure engine 522 associated with the ray tracing system of diagram 500 illustrated in FIG. 5. In some cases, the acceleration data structure can include a bounding volume hierarchy (BVH). For example, the acceleration data structure can include the BVH illustrated in FIGS. 4B and/or the one or more nodes can include one or more of the BVH nodes illustrated in FIGS. 4B, 8A, and 8B. In one illustrative example, at least one of the obtained nodes is a BVH node associated with, including, or storing one or more triangles or other geometric primitives. For example, at least one of the obtained nodes can be a compressed BVH node that includes triangle geometry (e.g., coordinates representing a triangle, such as coordinates of the triangle vertices).

At block 1004, the process 1000 includes storing the one or more nodes in a cache associated with a ray tracing processor. Each of the one or more stored nodes are cache line-aligned with the cache associated with the ray tracing processor. In one illustrative example, the ray tracing processor can be a ray tracing unit (RTU). In some aspects, the RTU can be included in or otherwise associated with a graphics processing unit (GPU) and/or a ray tracing system, such as the ray tracing system 500 illustrated in FIG. 5. For example, the ray tracing processor (e.g., RTU) can be the same as or similar to one or more of the RTU 610 illustrated in FIG. 6 and/or the RTU 710 illustrated in FIG. 7.

In some examples, the ray tracing processor (e.g., RTU) can be communicatively coupled (e.g., directly or indirectly) to one or more caches of a GPU that includes the RTU. For example, when the RTU is included in a GPU or other ray tracing system, the GPU can include a plurality of caches arranged in a hierarchical fashion. In some cases, the one or more GPU caches are above an RTU cache (e.g., RTU L0 cache) in the hierarchy. In such an example, data can initially be stored in the one or more GPU caches above the RTU cache, and the RTU cache (e.g., RTU L0 cache) can subsequently obtain input data of BVH nodes from a communicative chain that includes the one or more GPU caches. In one illustrative example, the one or more GPU caches can be associated with the RTU by way of the one or more GPU caches being used to feed an RTU cache (e.g., RTU L0 cache).

In some examples, the ray tracing processor (e.g., RTU) can receive constant-sized (e.g., 64-byte) BVH nodes that are cache line-aligned with one or more GPU caches and/or caches associated with the RTU. In one illustrative example, a number of bytes included in each node of the one or more nodes obtained by the ray tracing processor (e.g., RTU) is the same as a number of bytes included in a cache line of the cache associated with the ray tracing processor. In one illustrative example, the RTU can receive constant-sized 64-byte BVH nodes that are cache line-aligned with one or more of the GPU cache(s) and the RTU cache(s). For example, the constant-sized 64-byte compressed BVH nodes may be cache line-aligned with an RTU L0 cache that is also 64 bytes per cache line. In another example, the constant-sized 64-byte compressed BVH nodes may be cache line-aligned with one or more GPU caches that are hierarchically above the RTU cache (e.g., RTU L0 cache). The one or more GPU caches feed data to the RTU cache. For example, the constant-sized 64-byte compressed BVH nodes may be cache line-aligned with one or more GPU caches that are 64 bytes per cache line, 128 bytes per cache line, 256 bytes per cache line, etc.

In some examples, the ray tracing processor (e.g., RTU) can include two or more ray-triangle arithmetic logic units (ALUs), four or more ray-bounding volume ALUs, and two or more shared floating point logic ALUs. For example, the RTU can include two or more ray-triangle ALUs that are the same as or similar to the ray intersection ALU 820 illustrated in FIGS. 8A and 8B. In some examples, the TRU can include ray-triangle ALUs that use one or more shared ray-box ray-triangle (RB-RT) intersection units, such as the shared RB-RT logic unit 900 illustrated in FIG. 9. In some examples, each ray-triangle ALU of the two or more ray-triangle ALUs of the ray tracing processor (e.g., RTU) can include a ray-triangle logic unit and one shared floating point logic ALU. Each ray-bounding volume ALU of the four or more ray-bounding volume ALUs can include two ray-bounding volume logic units and a shared floating point logic ALU that is shared with one of the ray-triangle ALUs, such that the same given one of the shared floating point logic ALUs may be shared by one ray-triangle logic unit of the RTU and two ray-box ALUs of the RTU.

At block 1006, the process 1000 includes providing a first stored node of the one or more stored nodes for processing by the ray tracing processor. The first stored node is provided for processing during a first clock cycle of the ray tracing processor. In one illustrative example, providing the first stored node for processing by the ray tracing processor further includes determining, using the ray tracing processor, one or more ray-node intersections based on the first stored node. The one or more ray-node intersections based on the first stored node are determined during the first clock cycle of the ray tracing processor. As mentioned previously, the first stored node can include a first quantity of geometric primitives (e.g., triangles) of the acceleration data structure (e.g., BVH). The first stored node may also be cache line-aligned with a first cache line of the cache (e.g., one or more GPU caches and/or a RTU cache) associated with the ray tracing processor. In some aspects, providing the first stored node to the ray tracing processor further includes determining, during the first clock cycle and using the ray tracing processor, two or more ray-triangle intersections based on two or more triangles included in the first stored node.

At block 1008, the process 1000 includes providing a second stored node of the one or more stored nodes for processing by the ray tracing processor. The second stored node is provided for processing during a second clock cycle of the ray tracing processor. In one illustrative example, the first clock cycle of the ray tracing processor and the second clock cycle of the ray tracing processor can be consecutive clock cycles, such that the first and second stored acceleration data structure nodes are processed (e.g., ray-node intersection is performed) in two consecutive clock cycles of the RTU. In some cases, no intervening nodes are processed between the first and second node (e.g., the first node is provided for processing during the first clock cycle of the ray tracing processor and the second stored node is provided for processing during the second clock cycle of the ray tracing processor, without any other nodes being processed between the first and second nodes). In some aspects, providing the second stored node for processing by the ray tracing processor further includes determining, using the ray tracing processor, one or more ray-node intersections based on the second stored node. The one or more ray-node intersections based on the first stored node are determined during the first clock cycle of the ray tracing processor. In some examples, the second stored node includes a second quantity of bounding volumes of the acceleration data structure (e.g., AABBs). In some cases, the second quantity of bounding volumes is twice as large as the first quantity of triangles included in the first stored node of the acceleration data structure. In some examples, the second stored node can be cache line-aligned with a second cache line of the cache associated with the ray tracing processor, in a same or similar manner as described above with respect to the cache line-alignment of the first stored node.

In some examples, the processes described herein (e.g., process 1000 and/or any other process described herein)

may be performed by a computing device, apparatus, or system. In one example, the process 1000 can be performed by a computing device or system having the computing device architecture 1100 of FIG. 11. The computing device, apparatus, or system can include any suitable device, such as a mobile device (e.g., a mobile phone), a desktop computing device, a tablet computing device, a wearable device (e.g., a VR headset, an AR headset, AR glasses, an extended reality (XR) device (e.g., a VR headset or HMD, an AR headset, HMD, or glasses, etc.), a network-connected watch or smartwatch, or other wearable device), a server computer, an autonomous vehicle or computing device of an autonomous vehicle, a robotic device, a laptop computer, a smart television, a camera, and/or any other computing device with the resource capabilities to perform the processes described herein, including the process 1000 and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 1000 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1000 and/or any other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 11:
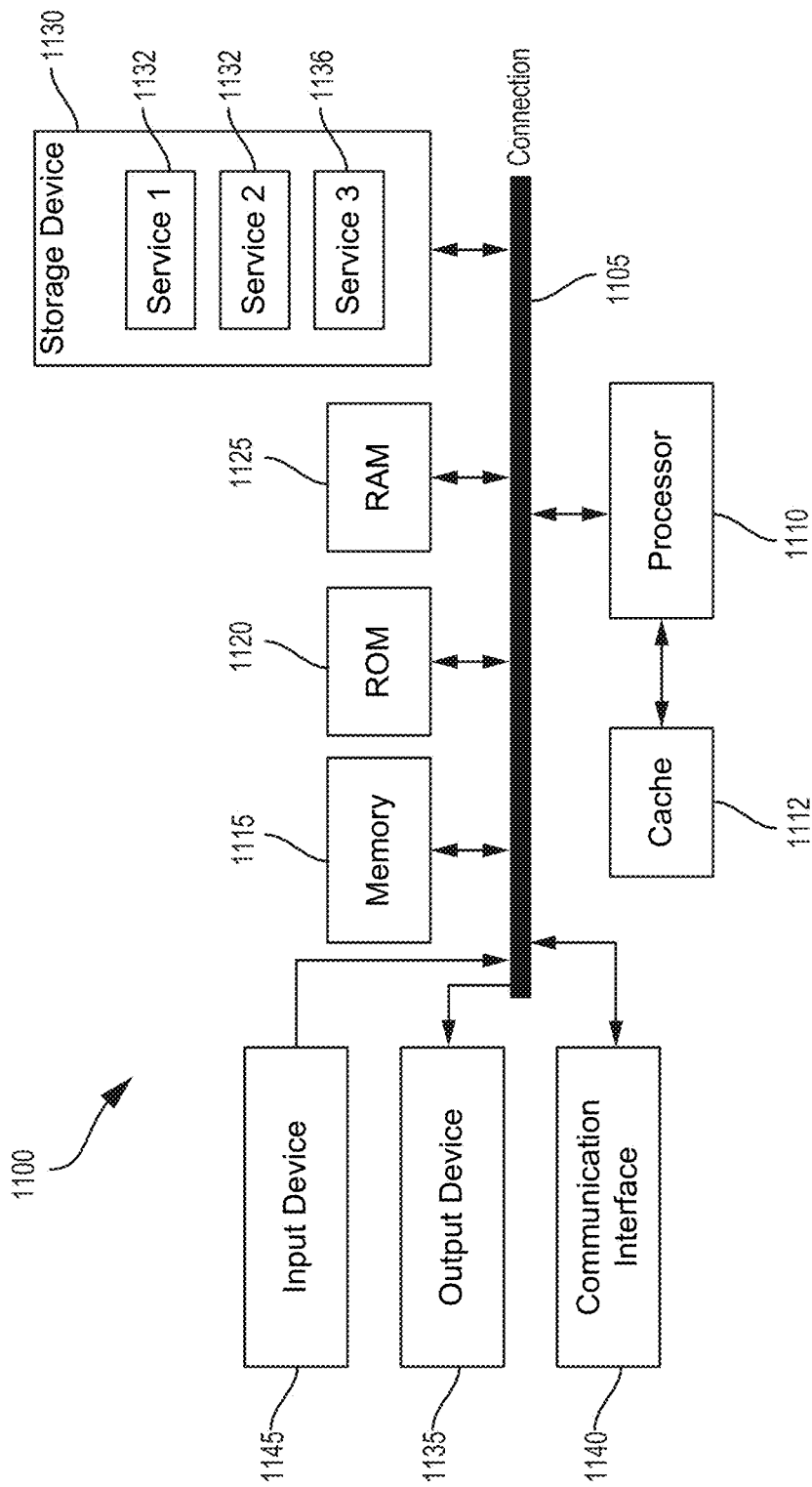
FIG. 11 is a block diagram illustrating an example of a computing system for implementing certain aspects described herein.

FIG. 11 illustrates an example computing device architecture 1100 of an example computing device which can implement the various techniques described herein. In some examples, the computing device can include a mobile device, a wearable device, an extended reality device (e.g., a virtual reality (VR) device, an augmented reality (AR) device, an extended reality (XR) device, or a mixed reality (MR) device), a personal computer, a laptop computer, a video server, a vehicle (or computing device of a vehicle), or other device. The components of computing device architecture 1100 are shown in electrical communication with each other using connection 1105, such as a bus. The example computing device architecture 1100 includes a processing unit (CPU or processor) 1110 and computing device connection 1105 that couples various computing device components including computing device memory 1115, such as read only memory (ROM) 1120 and random-access memory (RAM) 1125, to processor 1110.

Computing device architecture 1100 can include a cache of high-speed memory connected directly with, in close proximity to, or integrated as part of processor 1110. Computing device architecture 1100 can copy data from memory 1115 and/or the storage device 1130 to cache 1112 for quick access by processor 1110. In this way, the cache can provide a performance boost that avoids processor 1110 delays while waiting for data. These and other engines can control or be configured to control processor 1110 to perform various actions. Other computing device memory 1115 may be available for use as well. Memory 1115 can include multiple different types of memory with different performance characteristics. Processor 1110 can include any general-purpose processor and a hardware or software service, such as service 1 1132, service 2 1134, and service 3 1136 stored in storage device 1130, configured to control processor 1110 as well as a special-purpose processor where software instructions are incorporated into the processor design. Processor 1110 may be a self-contained system, containing multiple cores or processors, a bus, memory controller, cache, etc. A multi-core processor may be symmetric or asymmetric.

To enable user interaction with the computing device architecture 1100, input device 1145 can represent any number of input mechanisms, such as a microphone for speech, a touch-sensitive screen for gesture or graphical input, keyboard, mouse, motion input, speech and so forth. Output device 1135 can also be one or more of a number of output mechanisms known to those of skill in the art, such as a display, projector, television, speaker device, etc. In some instances, multimodal computing devices can enable a user to provide multiple types of input to communicate with computing device architecture 1100. Communication interface 1140 can generally govern and manage the user input and computing device output. There is no restriction on operating on any particular hardware arrangement and therefore the basic features here may easily be substituted for improved hardware or firmware arrangements as they are developed.

Storage device 1130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1125, read only memory (ROM) 1120, and hybrids thereof. Storage device 1130 can include services 1132, 1134, 1136 for controlling processor 1110. Other hardware or software modules or engines are contemplated. Storage device 1130 can be connected to the computing device connection 1105. In one aspect, a hardware module that performs a particular function can include the software component stored in a computer-readable medium in connection with the necessary hardware components, such as processor 1110, connection 1105, output device 1135, and so forth, to carry out the function.

Aspects of the present disclosure are applicable to any suitable electronic device (such as security systems, smartphones, tablets, laptop computers, vehicles, drones, or other devices) including or coupled to one or more active depth sensing systems.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, an engine, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, engines, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1: A method of ray tracing, the method comprising: obtaining one or more nodes of an acceleration data structure, each node of the one or more nodes including a same number of bytes; storing the one or more nodes in a cache associated with a ray tracing processor, wherein each of the one or more stored nodes are cache line-aligned with the cache associated with the ray tracing processor; providing a first stored node of the one or more stored nodes for processing by the ray tracing processor, wherein the first stored node is provided for processing by the ray tracing processor during a first clock cycle of the ray tracing processor; and providing a second stored node of the one or more stored nodes for processing by the ray tracing processor, wherein the second stored node is provided for processing by the ray tracing processor during a second clock cycle of the ray tracing processor.

Aspect 2: The method of Aspect 1, wherein the first clock cycle of the ray tracing processor and the second clock cycle of the ray tracing processor are consecutive clock cycles.

Aspect 3: The method of any of Aspects 1 to 2, wherein: providing the first stored node for processing by the ray tracing processor further includes determining, using the ray tracing processor, one or more ray-node intersections based on the first stored node; and providing the second stored node for processing by the ray tracing processor further includes determining, using the ray tracing processor, one or more ray-node intersections based on the second stored node.

Aspect 4: The method of Aspect 3, wherein: the one or more ray-node intersections based on the first stored node are determined during the first clock cycle of the ray tracing processor; and the one or more ray-node intersections based on the second stored node are determined during the second clock cycle of the ray tracing processor.

Aspect 5: The method of any of Aspects 1 to 4, wherein: the first stored node includes a first quantity of geometric primitives of the acceleration data structure; the second stored node includes a second quantity of bounding volumes of the acceleration data structure; and the first stored node is cache line-aligned with a first cache line of the cache associated with the ray tracing processor and the second stored node is cache line-aligned with a second cache line of the cache associated with the ray tracing processor.

Aspect 6: The method of Aspect 5, wherein the second quantity is twice as large as the first quantity.

Aspect 7: The method of any of Aspects 1 to 6, wherein: providing the first stored node to the ray tracing processor further comprises determining, during the first clock cycle and using the ray tracing processor, two or more ray-triangle intersections based on two or more triangles included in the first stored node; and providing the second stored node to the ray tracing processor further comprises determining, during the second clock cycle and using the ray tracing processor, four or more ray-bounding volume intersections based on four or more bounding volumes included in the second stored node.

Aspect 8: The method of Aspect 7, wherein the ray tracing processor includes: two or more ray-triangle arithmetic logic units (ALUs); four or more ray-bounding volume ALUs; and two or more shared floating point logic ALUs.

Aspect 9: The method of Aspect 8, wherein: each ray-triangle ALU of the two or more ray-triangle ALUs includes a ray-triangle logic unit and one of the two or more shared floating point logic ALUs; each ray-bounding volume ALU of the four or more ray-bounding volume ALUs includes two ray-bounding volume logic units and one of the two or more shared floating point logic ALUs; a first ray-triangle ALU includes a first shared floating point ALU of the two or more shared floating point logic ALUs; and a first ray-bounding volume ALU and a second ray-bounding volume ALU include the first shared floating point ALU.

Aspect 10: The method of any of Aspects 1 to 9, wherein: the first stored node is a bounding volume hierarchy (BVH) node associated with one or more triangles; and the one or more triangles are stored in the BVH node.

Aspect 11: The method of Aspect 10, wherein the BVH node stores the one or more triangles as a set of coordinates associated with vertices of the one or more triangles.

Aspect 12: The method of any of Aspects 1 to 11, wherein the cache associated with the ray tracing processor is a graphics processing unit (GPU) cache.

Aspect 13: The method of any of Aspects 1 to 12, wherein the cache associated with the ray tracing processor is a level 0 (L0) cache of the ray tracing processor.

Aspect 14: The method of any of Aspects 1 to 13, wherein a number of bytes included in each node of the one or more nodes is the same as a number of bytes included in a cache line of the cache associated with the ray tracing processor.

Aspect 15: The method of Aspect 14, wherein each node of the one or more nodes is 64 bytes.

Aspect 16: The method of any of Aspects 1 to 15, wherein the ray tracing processor is a ray tracing unit (RTU).

Aspect 17: An apparatus for ray tracing, comprising: a memory; and one or more processors coupled to the memory, the one or more processors configured to: obtain one or more nodes of an acceleration data structure, each node of the one or more nodes including a same number of bytes; store the one or more nodes in a cache associated with a ray tracing processor, wherein each of the one or more stored nodes are cache line-aligned with the cache associated with the ray tracing processor; provide a first stored node of the one or more stored nodes for processing by the ray tracing processor, wherein the first stored node is provided for processing by the ray tracing processor during a first clock cycle of the ray tracing processor; and provide a second stored node of the one or more stored nodes for processing by the ray tracing processor, wherein the second stored node is provided for processing by the ray tracing processor during a second clock cycle of the ray tracing processor.

Aspect 18: The apparatus of Aspect 17, wherein the first clock cycle of the ray tracing processor and the second clock cycle of the ray tracing processor are consecutive clock cycles.

Aspect 19: The apparatus of any of Aspects 17 to 18, wherein the one or more processors are configured to: determine one or more ray-node intersections based on the first stored node; and determine one or more ray-node intersections based on the second stored node.

Aspect 20: The apparatus of Aspect 19, wherein the one or more ray-node intersections based on the first stored node are determined during the first clock cycle of the ray tracing processor; and the one or more ray-node intersections based on the second stored node are determined during the second clock cycle of the ray tracing processor.

Aspect 21: The apparatus of any of Aspects 17 to 20, wherein: the first stored node includes a first quantity of geometric primitives of the acceleration data structure; the second stored node includes a second quantity of bounding volumes of the acceleration data structure; and the first stored node is cache line-aligned with a first cache line of the cache associated with the ray tracing processor and the second stored node is cache line-aligned with a second cache line of the cache associated with the ray tracing processor.

Aspect 22: The apparatus of Aspect 21, wherein the second quantity is twice as large as the first quantity.

Aspect 23: The apparatus of any of Aspects 17 to 22, wherein the one or more processors are configured to: determine, during the first clock cycle, two or more ray-triangle intersections based on two or more triangles included in the first stored node; and determine, during the second clock cycl, four or more ray-bounding volume intersections based on four or more bounding volumes included in the second stored node.

Aspect 24: The apparatus of Aspect 23, wherein the ray tracing processor includes: two or more ray-triangle arithmetic logic units (ALUs); four or more ray-bounding volume ALUs; and two or more shared floating point logic ALUs.

Aspect 25: The apparatus of Aspect 24, wherein each ray-triangle ALU of the two or more ray-triangle ALUs includes a ray-triangle logic unit and one of the two or more shared floating point logic ALUs; each ray-bounding volume ALU of the four or more ray-bounding volume ALUs includes two ray-bounding volume logic units and one of the two or more shared floating point logic ALUs; a first ray-triangle ALU includes a first shared floating point ALU of the two or more shared floating point logic ALUs; and a first ray-bounding volume ALU and a second ray-bounding volume ALU include the first shared floating point ALU.

Aspect 26: The apparatus of any of Aspects 17 to 25, wherein the first stored node is a bounding volume hierarchy (BVH) node associated with one or more triangles; and the one or more triangles are stored in the BVH node.

Aspect 27: The apparatus of Aspect 26, wherein the BVH node stores the one or more triangles as a set of coordinates associated with vertices of the one or more triangles.

Aspect 28: The apparatus of any of Aspects 17 to 27, wherein the cache associated with the ray tracing processor is a graphics processing unit (GPU) cache.

Aspect 29: The apparatus of any of Aspects 17 to 28, wherein the cache associated with the ray tracing processor is a level 0 (L0) cache of the ray tracing processor.

Aspect 30: The apparatus of any of Aspects 17 to 29, wherein a number of bytes included in each node of the one or more nodes is the same as a number of bytes included in a cache line of the cache associated with the ray tracing processor.

Aspect 31: The apparatus of Aspect 30, wherein each node of the one or more nodes is 64 bytes.

Aspect 32: The apparatus of any of Aspects 17 to 31, wherein the ray tracing processor is a ray tracing unit (RTU).

Aspect 33: A non-transitory computer-readable storage medium having stored thereon instructions which, when executed by one or more processor, cause the one or more processors to perform any of the operations of Aspects 1 to 32.

Aspect 34: An apparatus comprising means for performing any of the operations of Aspects 1 to 32.

What is claimed is:

1. A method of ray tracing, the method comprising:
obtaining one or more nodes of an acceleration data structure, wherein each node of the one or more nodes is a constant-sized node including a constant number of bytes;
storing the one or more nodes in a cache associated with a ray tracing processor, wherein each of the one or more stored nodes are cache line-aligned with the cache associated with the ray tracing processor;
providing a first stored node of the one or more stored nodes for processing by a ray-node intersection logic unit of the ray tracing processor, wherein the ray-node intersection logic unit includes a shared floating point arithmetic logic unit (ALU), and wherein the ray-node intersection logic unit uses a first configuration of the shared floating point ALU to determine two or more ray-triangle intersections corresponding to the first stored node within a first clock cycle of the ray tracing processor; and
providing a second stored node of the one or more stored nodes for processing by the ray-node intersection logic unit of the ray tracing processor, wherein the ray-node intersection logic unit uses a second configuration of the shared floating point ALU to determine four or more ray-bounding volume intersections corresponding to the second stored node within a second clock cycle of the ray tracing processor, wherein the first clock cycle and the second clock cycle are consecutive clock cycles.

2. The method of claim 1, wherein:
the ray-node intersection logic unit of the ray tracing processor is configured to determine the two or more ray-triangle intersections based on two or more triangles included in the first stored node; and
the ray-node intersection logic unit of the ray tracing processor is configured to determine the four or more ray-bounding volume intersections based on four or more bounding volumes included in the second stored node.

3. The method of claim 2, wherein:
the two or more ray-triangle intersections based on the first stored node are determined during the first clock cycle of the ray tracing processor; and
the four or more ray-bounding volume intersections based on the second stored node are determined during the second clock cycle of the ray tracing processor.

4. The method of claim 1, wherein:
the first stored node comprises a leaf node of the acceleration data structure and includes a first quantity of geometric primitives of the acceleration data structure;
the second stored node comprises an internal node of the acceleration data structure and includes a second quantity of bounding volumes of the acceleration data structure; and
the first stored node is cache line-aligned with a first cache line of the cache associated with the ray tracing processor and the second stored node is cache line-aligned with a second cache line of the cache associated with the ray tracing processor.

5. The method of claim 4, wherein the second quantity is twice as large as the first quantity.

6. The method of claim 1, wherein the ray-node intersection logic unit of the ray tracing processor further includes two or more ray-triangle logic units, and wherein the ray-node intersection logic unit uses the two or more ray-triangle logic units and the first configuration of the shared floating point ALU to determine the two or more ray-triangle intersections.

7. The method of claim 1, wherein the ray-node intersection logic unit of the ray tracing processor further includes four or more ray-bounding volume logic units, and wherein the ray-node intersection logic unit uses the four or more ray-bounding volume logic units and the second configuration of the shared floating point ALU to determine the four or more ray-bounding volume intersections.

8. The method of claim 1, wherein:
the first stored node is a bounding volume hierarchy (BVH) node associated with two or more triangles corresponding to the two or more ray-triangle intersections; and
the two or more triangles are stored in the BVH node.

9. The method of claim 8, wherein the BVH node stores the two or more triangles as respective sets of coordinates associated with vertices of the two or more triangles.

10. The method of claim 1, wherein the cache associated with the ray tracing processor is a graphics processing unit (GPU) cache.

11. The method of claim 1, wherein the cache associated with the ray tracing processor is a level 0 (L0) cache of the ray tracing processor.

12. The method of claim 1, wherein:
a number of bytes included in each node of the one or more nodes is equal to the constant number of bytes; and
each node of the one or more nodes is cache line-aligned with the cache associated with ray tracing processor based on the constant number of bytes being equal to a number of bytes included in a cache line of the cache associated with the ray tracing processor.

13. The method of claim 12, wherein each node of the one or more nodes is 64 bytes.

14. The method of claim 1, wherein the ray tracing processor is a ray tracing unit (RTU).

15. An apparatus for ray tracing, comprising:
a memory; and
one or more processors coupled to the memory, the one or more processors configured to:
obtain one or more nodes of an acceleration data structure wherein each node of the one or more nodes is a constant-sized node including a constant number of bytes;
store the one or more nodes in a cache associated with a ray tracing processor, wherein each of the one or more stored nodes are cache line-aligned with the cache associated with the ray tracing processor;
provide a first stored node of the one or more stored nodes for processing by a ray-node intersection logic unit of the ray tracing processor, wherein the ray-node intersection logic unit includes a shared floating point arithmetic logic unit (ALU), and wherein the ray-node intersection logic unit uses a first configuration of the shared floating point ALU to determine two or more ray-triangle intersections corresponding to the first stored node within a first clock cycle of the ray tracing processor; and
provide a second stored node of the one or more stored nodes for processing by the ray-node intersection logic unit of the ray tracing processor, wherein the ray-node intersection logic unit uses a second configuration of the shared floating point ALU to determine four or more ray-bounding volume intersections corresponding to the second stored node within a second clock cycle of the ray tracing processor, wherein the first clock cycle and the second clock cycle are consecutive clock cycles.

16. The apparatus of claim 15, wherein the one or more processors are configured to:
use the ray-node intersection logic unit to determine the two or more ray-triangle intersections based on two or more triangles included in the first stored node; and
use the ray-node intersection logic unit to determine the four or more ray-bounding volume intersections based on four or more bounding volumes included in the second stored node.

17. The apparatus of claim 16, wherein:
the two or more ray-triangle intersections based on the first stored node are determined during the first clock cycle of the ray tracing processor; and
the four or more ray-bounding volume intersections based on the second stored node are determined during the second clock cycle of the ray tracing processor.

18. The apparatus of claim 15, wherein:
the first stored node comprises a leaf node of the acceleration data structure and includes a first quantity of geometric primitives of the acceleration data structure;
the second stored node comprises an internal node of the acceleration data structure and includes a second quantity of bounding volumes of the acceleration data structure; and
the first stored node is cache line-aligned with a first cache line of the cache associated with the ray tracing processor and the second stored node is cache line-aligned with a second cache line of the cache associated with the ray tracing processor.

19. The apparatus of claim 18, wherein the second quantity is twice as large as the first quantity.

20. The apparatus of claim 15, wherein the ray-node intersection logic unit of the ray tracing processor further includes two or more ray-triangle logic units, and wherein the ray-node intersection logic unit uses the two or more ray-triangle logic units and the first configuration of the shared floating point ALU to determine the two or more ray-triangle intersections.

21. The apparatus of claim 15, wherein the ray-node intersection logic unit of the ray tracing processor further includes four or more ray-bounding volume logic units, and wherein the ray-node intersection logic unit uses the four or more ray-bounding volume logic units and the second configuration of the shared floating point ALU to determine the four or more ray-bounding volume intersections.

22. The apparatus of claim 15, wherein:
the first stored node is a bounding volume hierarchy (BVH) node associated with two or more triangles corresponding to the two or more ray-triangle intersections; and
the two or more triangles are stored in the BVH node.

23. The apparatus of claim 22, wherein the BVH node stores the two or more triangles as respective sets of coordinates associated with vertices of the two or more triangles.

24. The apparatus of claim 15, wherein the cache associated with the ray tracing processor is a graphics processing unit (GPU) cache.

25. The apparatus of claim 15, wherein the cache associated with the ray tracing processor is a level 0 (L0) cache of the ray tracing processor.

26. The apparatus of claim 15, wherein:
a number of bytes included in each node of the one or more nodes is equal to the constant number of bytes; and
each node of the one or more nodes is cache line-aligned with the cache associated with ray tracing processor based on the constant number of bytes being equal to a number of bytes included in a cache line of the cache associated with the ray tracing processor.

27. The apparatus of claim 26, wherein each node of the one or more nodes is 64 bytes.

28. The apparatus of claim 15, wherein the ray tracing processor is a ray tracing unit (RTU).

29. A non-transitory computer-readable medium having stored thereon instructions that, when executed by one or more processors, cause the one or more processors to:
obtain one or more nodes of an acceleration data structure wherein each node of the one or more nodes is a constant-sized node including a constant number of bytes;
store the one or more nodes in a cache associated with a ray tracing processor, wherein each of the one or more stored nodes are cache line-aligned with the cache associated with the ray tracing processor;
provide a first stored node of the one or more stored nodes for processing by a ray-node intersection logic unit of the ray tracing processor, wherein the ray-node intersection logic unit includes a shared floating point arithmetic logic unit (ALU), and wherein the ray-node intersection logic unit uses a first configuration of the shared floating point ALU to determine two or more ray-triangle intersections corresponding to the first stored node within a first clock cycle of the ray tracing processor; and
provide a second stored node of the one or more stored nodes for processing by the ray-node intersection logic unit of the ray tracing processor, wherein the ray-node intersection logic unit uses a second configuration of the shared floating point ALU to determine four or more ray-bounding volume intersections corresponding to the second stored node within a second clock cycle of the ray tracing processor, wherein the first clock cycle and the second clock cycle are consecutive clock cycles.

* * * * *